US008116480B2

(12) United States Patent
Kubo

(10) Patent No.: US 8,116,480 B2
(45) Date of Patent: Feb. 14, 2012

(54) FILTER COEFFICIENT CALCULATION DEVICE, FILTER COEFFICIENT CALCULATION METHOD, CONTROL PROGRAM, COMPUTER-READABLE STORAGE MEDIUM, AND AUDIO SIGNAL PROCESSING APPARATUS

(75) Inventor: Katsutoshi Kubo, Yaita (JP)

(73) Assignee: Sharp Kabushiki Kaisha, Osaka (JP)

( * ) Notice: Subject to any disclaimer, the term of this patent is extended or adjusted under 35 U.S.C. 154(b) by 1050 days.

(21) Appl. No.: 12/023,891

(22) Filed: Jan. 31, 2008

(65) Prior Publication Data

US 2008/0192957 A1 Aug. 14, 2008

(30) Foreign Application Priority Data

Feb. 9, 2007 (JP) ................................ 2007-031236

(51) Int. Cl.
*H04B 15/00* (2006.01)

(52) U.S. Cl. ...................................................... 381/94.2

(58) Field of Classification Search .............. 381/90–94, 381/103, 94.2
See application file for complete search history.

(56) References Cited

U.S. PATENT DOCUMENTS

| | | | | |
|---|---|---|---|---|
| 4,888,808 A | | 12/1989 | Ishikawa et al. | |
| 5,572,443 A | | 11/1996 | Emoto et al. | |
| 7,042,287 B2 | * | 5/2006 | Robinson | 330/149 |
| 7,057,455 B2 | * | 6/2006 | Robinson | 330/149 |
| 2005/0017800 A1 | * | 1/2005 | Robinson | 330/149 |
| 2005/0129140 A1 | * | 6/2005 | Robinson | 375/297 |
| 2006/0067538 A1 | * | 3/2006 | Huang | 381/71.1 |

FOREIGN PATENT DOCUMENTS

| | | | |
|---|---|---|---|
| JP | 63-281510 | A | 11/1988 |
| JP | 8-110783 | A | 4/1996 |
| JP | 8-237056 | A | 9/1996 |
| JP | 2003-168958 | A | 6/2003 |
| JP | 2003-224898 | A | 8/2003 |

OTHER PUBLICATIONS http://www.sound.sie.dendal.ac.jp/dsp/Text/PDF/Chap_7-2.pdf (Acoustic Laboratory, confirmed on Jan. 25, 2007).

* cited by examiner

*Primary Examiner* — Nathan Ha

(74) *Attorney, Agent, or Firm* — Birch, Stewart, Kolasch & Birch, LLP

(57) ABSTRACT

In a filter coefficient calculation device according to the present invention, a gain correction characteristic calculation section calculates impulse responses corresponding to a linear-phase filter having an inverse characteristic of a gain characteristic of a reproduction system, and calculates, as a gain correction characteristic, a frequency characteristic of continuous-time impulse responses that include a peak value, the continuous-time impulse responses being impulse responses, clipped from the calculated impulse responses, whose number is identical to the preset number of filter taps. Moreover, a phase correction characteristic calculation section calculates a phase correction characteristic by normalizing, from an inverse characteristic of a frequency characteristic of the reproduction system, a gain characteristic of the inverse characteristic, and a filter coefficient calculation section calculates, as filter coefficients of the reproduction characteristic correction filter, filter coefficients of a filter having a synthetic correction characteristic obtained by combining the gain correction characteristic with the phase correction characteristic. This makes it possible to correct acoustic characteristics with high accuracy even in cases where the number of taps is limited.

9 Claims, 16 Drawing Sheets

FILTER COEFFICIENT CALCULATION DEVICE, FILTER COEFFICIENT CALCULATION METHOD, CONTROL PROGRAM, COMPUTER-READABLE STORAGE MEDIUM, AND AUDIO SIGNAL PROCESSING APPARATUS

This Nonprovisional application claims priority under 35 U.S.C. §119(a) on Patent Application No. 031236/2007 filed in Japan on Feb. 9, 2007, the entire contents of which are hereby incorporated by reference.

FIELD OF THE INVENTION

The present invention relates to a filter coefficient calculation device, a filter coefficient calculation method, a control program, a computer-readable storage medium, and an audio signal processing apparatus by each of which the acoustic characteristics of a listening room or the like with respect to sound outputted from an audio output apparatus or the like are corrected with use of a digital filter so as to be suited to the audiovisual environment.

BACKGROUND OF THE INVENTION

An equalizer by which the overall response characteristics of a reproduction system including a speaker and the like are corrected in accordance with the acoustic characteristics of a listening room is widely used. The acoustic characteristics of a listening room vary depending on the type of room and the installation location of an apparatus for reproducing sound. For example, sound echoes greatly in a wooden-floor room, and sound is absorbed in a bedroom provided with large furniture such as beds. However, sound is hardly absorbed and echoes less in a tatami-floored room provided with no large furniture. Further, the overall acoustic characteristics of a listening room vary between a case where a speaker is placed in parallel with a wall surface of the room and a case where the speaker is placed in a corner of the room. The equalizer corrects output sound with use of an acoustic field control filter so that the quality of the output sound is suited to audiovisual environments having different acoustic characteristics.

For example, as a conventional technique for correcting the overall response characteristics of a reproduction system by adjusting audio quality, Patent Document 1 discloses an acoustic characteristic correction apparatus that allows a user to easily set a desired response characteristic of the reproduction system as a preferred characteristic.

The following describes the acoustic characteristic correction apparatus of Patent Document 1 more in detail. FIGS. 14(*a*) through 14(*e*) show various types of characteristics obtained in steps taken by the acoustic characteristic correction apparatus of Patent Document 1 in correcting acoustic characteristics. First, the acoustic characteristic correction apparatus of Patent Document 1 reproduces a measuring signal such as a band signal or a TSP signal with use of a speaker included in a reproduction system that is to be corrected, collects the reproduced sound with use of a microphone, and then calculates the response characteristics, i.e., measured characteristics (see FIG. 14(*a*)) of the reproduction system. Next, the acoustic characteristic correction apparatus calculates, as a correction characteristic (see FIG. 14(*c*)), a difference between the preferred characteristic (see FIG. 14(*b*)) set by the user and the measured characteristics, and then makes a modification as needed. Furthermore, the acoustic characteristic correction apparatus calculates corresponding impulse responses (see FIG. 14(*d*)) by performing inverse Fourier transform of the determined correction characteristic, and sets, as coefficients of an equalizer (FIR (finite impulse response)) filter, level values in respective positions of the calculated impulse responses on the time axis.

Patent Document 1 describes, as a method for calculating impulse responses from a correction characteristic by inverse Fourier transform, an embodiment that employs linear-phase inverse Fourier transform.

According to the linear-phase inverse Fourier transform, impulse responses are calculated by dividing the corrected characteristic into bands, by calculating a power average for each of the bands, by interpolating the power average values by spline interpolation or the like into 4096 pieces of data that can be subjected to Fourier transform, and then by performing inverse Fourier transformation of complex format data having a real part in which the interpolated data have been set (and an imaginary part that has been entirely set to 0). It should be noted here that the real part of the complex format data corresponds to an amplitude term and the imaginary part of the complex format data corresponds to a phase term. Moreover, since that imaginary part of the complex format data which corresponds to a phase term has been entirely set to 0 as described above, the impulse responses calculated by the linear-phase inverse Fourier transform contain no phase information.

Since a filter calculated by the linear-phase inverse Fourier transform, i.e., a linear-phase filter contains no phase information, filter coefficients are easily calculated, and a good frequency transfer characteristic is obtained. However, this makes it impossible to correct a phase lag caused by the reproduction system.

In order to solve this problem, there is a technique for correcting the acoustic characteristics of a reproduction system by using an inverted filter containing phase information. Non-patent Document 1 describes a method for designing the inverted filter.

The following provides an outline of the inverted filter. The inverted filter $H(z)$ is represented by $H(z)=1/C(z)$, where $C(z)$ is the transfer characteristic of the reproduction system. This formula indicates that the introduction of the inverted filter $H(z)$ equalizes an output and input of the reproduction system. That is, the inverted filter $H(z)$ is designed so that impulse responses of the reproduction system form a unit impulse (delta function $\delta(n)$). However, a normal reproduction system is not a minimum-phase transition system and contains a propagation delay. Therefore, the inverted filter $H(z)$ is designed so that the impulse responses are changed to form $\delta(n-M)$, where M is referred to as a modeling delay.

Further, depending on the transfer characteristic of the reproduction system, $H(z)=1/C(z)$ cannot be directly solved. However, an approximation of the inverted filter can be calculated, for example, in accordance with the least squares principle. The inverted filter designed in accordance with the least squares principle is generalized as $H(z)=C^*(z)/C^*(z)C(z)$, where $C(z)$ is a complex number and $C^*(z)$ is a conjugate complex number of $C(z)$.

Other various techniques have been proposed as a technique for correcting response characteristics by using an acoustic field control filter. For example, Patent Document 2 discloses an amplification articulation improving device capable of realizing amplification with high articulation in an environment where reverberations are likely to be heard. The following describes the amplification articulation improving device of Patent Document 2 more in detail. FIG. 15(*a*) shows the flow of a process by which the amplification articulation improving device of Patent Document 2 improves the articulation of amplification. As shown in FIG. 15(*a*), the amplification articulation improving device of Patent Document 2 measures an impulse response in a closed space and determines for each 1/n band whether or not the reverberation time exceeds a predetermined period of time. In cases where the reverberation time exceeds the predetermined period of time, the amplification articulation improving device calculates difference energy between the measured impulse response and an impulse response calculated from direct sound, and stacks the calculated difference energy in a memory. FIG. 15(*b*) shows difference energy for each 1/n (octave) frequency band. Furthermore, after the process of determining reverberation time and stacking difference energy has been performed for each 1/n frequency band, an inverse transfer function is calculated in accordance with the difference energy calculated for each frequency band, and equalizer parameters that satisfy the transfer function are set in a filter. This enables the amplification articulation improving device of Patent Document 2 to reduce the sound volume level of a frequency band having such a long reverberation time as to affect articulation. This makes it possible to realize amplification with high articulation without causing a big change in original audio quality.

Incidentally, a FIR filter is represented as an arrangement in which an output is obtained by causing a delay element (buffer) to sequentially delay input data, by causing a multiplier to multiply filter coefficients preset in the delay outputs, and by causing an adder to add the multiplied outputs. That is, the FIR filter processes a signal by performing a product-sum computation process. In order to realize a high-order FIR filter, it is necessary to perform such a product-sum computation process a large number of times. Moreover, in causing the FIR filter to process a signal, a DSP (digital signal processor) capable of performing multiplication and addition in one machine cycle and processing a product-sum computation at a high speed is used.

The FIR filter performs a product-sum computation of convolution as expressed by the following formula:

$$y(n)=h0\cdot x(n)+h1\cdot x(n-1)+h2\cdot x(n-2)+\ldots+hN\cdot x(n-N)$$

where y(n) is an output signal value, x(n−i) (i=0, 1, . . . N) is a present or past input signal value, and hi (i=0, 1, . . . N) is a filter coefficient (weight). That is, the output signal value of the FIR filter is represented by an average weighted with the present or past input signal value.

It should be noted that the FIR filter includes taps (each of which is a block constituted by the aforementioned delay element, the aforementioned multiplier, and the aforementioned adder) whose number corresponds to the number of terms of hi·x(n−i) included in the foregoing formula. Moreover, the characteristics of FIR filter are changed by changing the number of taps constituting the filter and by changing the value of hi of each of the taps. The larger the number of taps is, the higher the resolution of the frequency is. This results in higher performance of the filter.

However, an increase in the number of taps of the FIR filter (i.e., the number of filter coefficients) causes an increase in the number of such product-sum computations as described above, thereby causing an increase in the number of processes to be performed by the DSP. This makes it necessary to use a high-performance DSP, thereby causing an increase in cost necessary for constituting the FIR filter. Therefore, it is necessary to consider a trade-off between performance and cost in selecting a DSP that is to be mounted on a product.

[Patent Document 1]

Japanese Unexamined Patent Application Publication No. 327089/1994 (Tokukaihei 6-327089; published on Nov. 25, 1994)

[Patent Document 2]

Japanese Unexamined Patent Application Publication No. 224898/2003 (Tokukai 2003-224898; published on Aug. 8, 2003)

[Non-patent Document 1]

http://www.sound.sie.dendai.ac.jp/dsp/Text/PDF/C hap7-2.pdf (confirmed on Jan. 25, 2007)

As described above, a DSP to be mounted on a product is selected in consideration of a trade-off between performance and cost. Moreover, a FIR filter is designed in consideration of the capability of the selected DSP to perform a product-sum computation. Therefore, the number of taps of the FIR filter (i.e., the number of filter coefficients) is limited depending on the specifications of the DSP.

In cases where the filter coefficients of the FIR filter are calculated by the aforementioned inverted filter, first, impulse responses are measured with use of a TSP method or the like in a reproduction system whose audio quality is to be corrected, and a frequency characteristic of the impulse responses thus measured (hereinafter referred to as "measured impulse responses") is calculated. Then, a frequency characteristic of the inverted filter is calculated in accordance with the frequency characteristic thus calculated, and impulse responses corresponding to the inverted filter (such an impulse response being hereinafter referred to as "inverted filter impulse responses") are calculated by performing inverse Fourier transform of the frequency characteristic of the inverted filter. The inverted filter impulse responses are set as the filter coefficients of the FIR filter.

It should be noted that the aforementioned process of calculating the coefficients of the FIR filter is digital signal processing. After the measured impulse responses are loaded as a continuous analog signal, the signal is sampled so as to be converted into discrete digital signals. At this time, in order that high frequency component information contained in the original analog signal is incorporated into the digital signals, it is necessary to sufficiently narrow each sampling interval, i.e., to sufficiently increase the number of samples. Then, data (i.e., filter coefficients of the FIR filter) representing the aforementioned inverted filter impulse responses are calculated in accordance with data representing the measured impulse responses thus sampled.

At this time, the number of pieces of calculated data that represent the inverted filter impulse responses is identical to the number of pieces of data that represent the measured impulse responses. Then, the calculated data representing the inverted filter impulse responses are set as the coefficients of the FIR filter. However, as described above, the number of taps of a FIR filter (i.e., the number of filter coefficients) is limited depending on the specifications of a DSP. Therefore, all the calculated data representing the inverted filter impulse responses cannot be used as the coefficients of the FIR filter. Thus, the inverted filter impulse responses are clipped. That is, only a part of the calculated data representing the inverted filter impulse responses is taken out as the coefficients of the FIR filter.

However, in cases where only a part of the data representing the inverted filter impulse responses is set as the coefficients of the FIR filter, data that are not set as coefficients are discarded. This causes deterioration in performance of the FIR filter. Therefore, the correction of audio quality with use of the FIR filter thus calculated causes a serious error in corrected impulse responses, thereby causing a gain difference in a gain-frequency characteristic of the corrected impulse responses.

FIG. 16 shows inverted filter impulse responses calculated in accordance with measured impulse responses (the number of measured impulse responses sampled: 512). The number of pieces of data that represent the inverted filter impulse responses of FIG. 16 is 512, which is identical to the number of measured impulse responses sampled. In cases where the number of taps of a FIR filter is limited to 256 by the specifications of a DSP, for example, 256 pieces of data centered around the peak value of amplitude are extracted from the inverted filter impulse responses of FIG. 16 as coefficients of the FIR filter. That is, the pieces of data that fall within a range surrounded by the dashed line of FIG. 16 are discarded. In this case, the amplitude of the range of impulse responses surrounded by the dashed line of FIG. 16 is great, and is not small enough to be ignored as compared with the amplitudes of the whole impulse responses. Therefore, even if the audio quality is corrected by the FIR filter thus calculated, the corrected impulse responses and the corresponding frequency characteristic contain a large number of errors.

The present invention has been made in view of the foregoing problems, and it is an object of the present invention to provide a filter coefficient calculation device, a filter coefficient calculation method, a control program, a computer-readable storage medium, and an audio signal processing apparatus, each of which makes it possible to correct acoustic characteristics with high precision even in cases where the number of filter taps is limited.

SUMMARY OF THE INVENTION

A filter coefficient calculation device according to the present invention is a filter coefficient calculation device for calculating filter coefficients of a reproduction characteristic correction filter that corrects acoustic characteristics of a reproduction system configured to include an acoustic field, including: linear-phase impulse response calculating means for calculating impulse responses corresponding to a linear-phase filter having an inverse characteristic of a gain characteristic of the reproduction system; gain correction characteristic calculating means for calculating, as a gain correction characteristic, a frequency characteristic of continuous-time impulse responses that include a peak value, the continuous-time impulse responses being impulse responses, clipped from the impulse responses calculated by the linear-phase impulse response calculating means, whose number is identical to a preset number of filter taps; phase correction characteristic calculating means for calculating a phase correction characteristic by normalizing, from an inverse characteristic of a frequency characteristic of the reproduction system, a gain characteristic of the inverse characteristic; and filter coefficient calculating means for calculating, as filter coefficients of the reproduction characteristic correction filter, filter coefficients of a filter having a synthetic correction characteristic obtained by combining the gain correction characteristic with the phase correction characteristic.

According to the foregoing arrangement, the filter coefficient calculation device calculates filter coefficients of a reproduction characteristic correction filter that corrects the acoustic characteristics of a reproduction system configured to include an acoustic field. For example, in cases where sound is reproduced in a room, the transfer characteristic varies depending on the type and location of the room, and the acoustic characteristics, such as a time characteristic and a frequency characteristic, of the reproduced sound varies. In view of this, the acoustic characteristics are corrected by applying a filter to a sound signal on which the reproduced sound is based, so as to be suited to the audiovisual environment. The filter coefficient calculation device according to the present invention calculates filter coefficients that constitute the filter.

Moreover, in the filter coefficient calculation device, the linear-phase impulse response calculating means calculates, as filter coefficients of a linear-phase filter having an inverse characteristic of a gain characteristic of the reproduction system, impulse response data corresponding to the linear-phase filter. That is, the linear-phase impulse response calculating means calculates filter coefficients of a filter that corrects the gain characteristic (amplitude-frequency characteristic) of the reproduction system. The filter calculated by the linear-phase impulse response calculating means has a gain characteristic exactly opposite to the gain characteristic of the reproduction system, and the application of the filter can cause the gain characteristic of the reproduction system to approximate to a flat characteristic. Further, the filter calculated by the linear-phase impulse response calculating means is a linear-phase filter, which corrects only the gain characteristic of the reproduction system and will not cause a change in phase characteristic. Then, the linear-phase impulse response calculating means calculates, as filter coefficients of the linear-phase filter, impulse response data corresponding to the linear-phase filter. In calculating the impulse response data corresponding to the linear-phase filter, the linear-phase impulse response calculating means may perform, but is not particularly limited to, IDFT (inverse discrete Fourier transform) or IFFT (inverse fast Fourier transform), by which IDFT is performed at a high speed, with respect to the inverse characteristic of the gain characteristic of the reproduction system.

Then, the gain correction characteristic calculating means calculates, as a gain correction characteristic, a frequency characteristic of continuous-time impulse response data that include a peak value, the continuous-time impulse response data being impulse response data, clipped from the impulse response data calculated by the linear-phase impulse response calculating means, whose number is identical to the preset number of filter taps.

Normally, in cases where the acoustic characteristics of a reproduction system are calculated, impulse responses and the like are measured in accordance with sound actually reproduced in the reproduction system. Shorter intervals at which the measured impulse responses are sampled, i.e., more sampling data enables more accurate measurement. Moreover, for example, a frequency characteristic of the reproduction system is calculated by performing FFT (fast Fourier transform) of the measured impulse response sampling data. A frequency characteristic of a correction filter is calculated in accordance with the frequency characteristic of the reproduction system. Impulse response data corresponding to filter coefficients are calculated by performing IFFT of the frequency characteristic of the correction filter. The number of pieces of calculated impulse response data corresponding to filter coefficients is identical to the number of pieces of measured impulse response sampling data subjected to FFT above. However, in some cases, the number of filter taps, i.e., the number of filter coefficients is limited by the specifications of a DSP. Therefore, all the impulse response data, calculated by IFFT, which correspond to filter coefficients cannot be used as filter coefficients. This makes it necessary that data for use as filter coefficients be clipped in accordance with the specifications of a DSP from the impulse response data calculated by IFFT.

Conventionally, in cases where the frequency characteristic of the correction filter is calculated, a frequency characteristic of an inverted filter is calculated so as to contain gain information and phase information. In that case, the impulse responses calculated by IFFT forms a waveform that is broadened so as not to converge at either end. This enlarges the amplitude (FIR filter coefficients) of impulse responses that are discarded in case of such clipping as described above. This increases errors in correction performed by the resulting filter.

On the other hand, the impulse responses calculated by the gain correction characteristic calculating means forms a waveform that is centrally concentrated that is attenuated symmetrically so as to be centered around a peak value, and that converges at both ends. This makes it possible to reduce the amplitude (FIR filter coefficients) of impulse responses that are discarded when impulse response data whose number is identical to the preset number of filter taps are clipped from the impulse response data. This improves the precision of correction performed by the resulting filter.

Moreover, the phase correction characteristic calculating means calculates a phase correction characteristic by normalizing, from an inverse characteristic of a frequency characteristic of the reproduction system, a gain characteristic of the inverse characteristic. That is, the phase correction characteristic calculating means calculates a phase correction characteristic by performing, with respect to an inverse characteristic of a frequency characteristic of the reproduction system containing gain information and phase information, such normalization that the gain is 1 within the full range of frequencies. That is, the phase correction characteristic serves as a characteristic of an all-pass filter that corrects only a phase characteristic without changing a gain characteristic.

Moreover, the filter coefficient calculating means calculates, as filter coefficients of the reproduction characteristic correction filter, filter coefficients of a filter having a synthetic correction characteristic obtained by combining the gain correction characteristic with the phase correction characteristic. That is, the filter coefficient calculating means calculates the filter coefficients of the reproduction characteristic correction filter by performing IDFT (inverse discrete Fourier transform) or IFFT (inverse fast Fourier transform) with respect to the synthetic correction characteristic.

This makes it possible to calculate a reproduction characteristic correction filter corresponding to a synthetic correction characteristic obtained by combining (i) a gain correction characteristic corresponding to a filter that corrects only a gain characteristic with (ii) a phase correction characteristic corresponding to a filter that corrects only a phase characteristic. Moreover, the reproduction characteristic correction filter makes it possible to make both a gain correction and a phase correction.

Therefore, the present invention makes it possible to reduce the amplitude (FIR filter coefficients) of impulse responses that are discarded in cases where a gain correction characteristic for correcting a gain characteristic is calculated. Further, the gain correction characteristic is combined with a phase correction characteristic for correcting a phase characteristic. Therefore, even in cases where the number of filter taps is limited, a filter capable of precisely correcting acoustic characteristics can be realized.

Further, a filter coefficient calculating method according to the present invention is a filter coefficient calculation method for calculating filter coefficients of a reproduction characteristic correction filter that corrects acoustic characteristics of a reproduction system configured to include an acoustic field, including: linear-phase impulse response calculating step of calculating impulse responses corresponding to a linear-phase filter having an inverse characteristic of a gain characteristic of the reproduction system; gain correction characteristic calculating step of calculating, as a gain correction characteristic, a frequency characteristic of continuous-time impulse responses that include a peak value, the continuous-time impulse responses being impulse responses, clipped from the impulse responses calculated by the linear-phase impulse response calculating means, whose number is identical to a preset number of filter taps; phase correction characteristic calculating step of calculating a phase correction characteristic by normalizing, from an inverse characteristic of a frequency characteristic of the reproduction system, a gain characteristic of the inverse characteristic; and filter coefficient calculating step of calculating, as filter coefficients of the reproduction characteristic correction filter, filter coefficients of a filter having a synthetic correction characteristic obtained by combining the gain correction characteristic with the phase correction characteristic.

The foregoing arrangement brings about the same effects as those brought about by a filter coefficient calculation device according to the present invention.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 4(*a*) shows measured impulse responses that have been sampled. FIG. 4(*b*) shows a frequency characteristic of the measured impulse responses. FIG. 4(*c*) shows impulse responses corresponding to an inverse characteristic of the frequency characteristic of the measured impulse responses. FIG. 4(*d*) shows a gain correction characteristic calculated by the gain correction characteristic calculation section.

FIG. 8(*a*) shows impulse responses produced in cases where no corrections are made by a synthetic inverted filter. FIG. 8(*b*) shows impulse responses produced in cases where corrections are made by the synthetic inverted filter.

FIG. 9(*a*) shows a gain-frequency characteristic within a full range of frequencies. FIG. 9(*b*) shows a gain-frequency characteristic within a range of high frequencies.

FIG. 11(*a*) shows impulse responses of a FIR filter calculated solely in accordance with the gain correction characteristic without combining the phase correction characteristic therewith. FIG. 11(*b*) shows results obtained by measuring uncorrected and corrected impulse responses with use of the two microphones.

FIG. 12(*a*) shows measured impulse responses for use in combining the phase correction characteristic. FIG. 12(*b*) shows attenuation of reverberant energy at each sampling point with respect to the measured impulse responses of FIG. 12(*a*). FIG. 12(*c*) shows impulse responses of a FIR filter calculated in accordance with the synthetic correction characteristic obtained by combining the gain correction characteristic with the phase correction characteristic calculated without making any adjustment by an exponential attenuation window. FIG. 12(*d*) shows results obtained by measuring uncorrected and corrected impulse responses with use of the two microphones.

FIG. 13(*a*) shows measured impulse responses for use in combining the phase correction characteristic. FIG. 13(*b*) shows attenuation of reverberant energy at each sampling point with respect to the measured impulse responses of FIG. 13(*a*). FIG. 13(*c*) shows impulse responses of a FIR filter calculated in accordance with the synthetic correction characteristic obtained by combining the gain correction characteristic with the phase correction characteristic calculated by making an adjustment by an exponential attenuation window. FIG. 13(*d*) shows results obtained by measuring uncorrected and corrected impulse responses with use of the two microphones.

FIG. 14(*a*) shows measured characteristics of a reproduction system that is to be corrected. FIG. 14(*b*) shows a preferred characteristic set by a user. FIG. 14(*c*) shows a corrected characteristic. FIG. 14(*d*) shows linear-phase impulse responses corresponding to the corrected characteristic. FIG. 14(*e*) shows minimum phase impulse responses corresponding to the corrected characteristic.

FIG. 15(*a*) is a flow chart showing the flow of a process by which the amplification articulation improving device of Patent Document 2 improves the articulation of amplification. FIG. 15(*b*) shows difference energy for each 1/n (octave) frequency band.

DESCRIPTION OF THE EMBODIMENTS

An, acoustic characteristic correction apparatus 1 according to the present invention will be described below with reference to FIGS. 1 through 13(*d*).

(Acoustic Characteristic Correction Apparatus 1)

Figure 1:
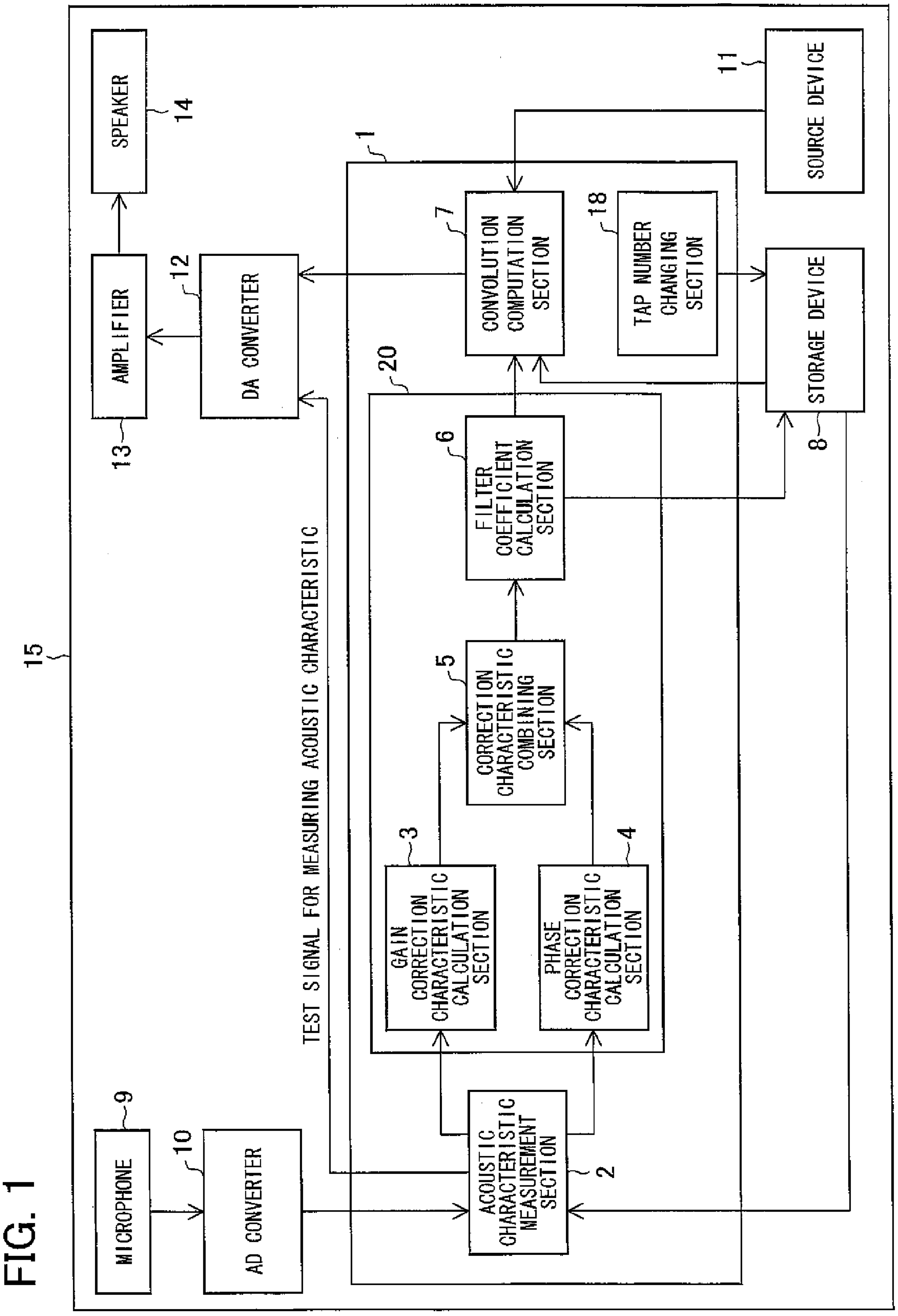
FIG. 1 is a block diagram showing an arrangement of an acoustic characteristic correction apparatus according to the present invention.

FIG. 1 is a block diagram showing an arrangement of the acoustic characteristic correction apparatus 1 (audio signal processing apparatus) according to the present invention. The acoustic characteristic correction apparatus 1 according to the present invention includes an acoustic characteristic measurement section 2 (measured impulse response calculating means), a gain correction characteristic calculation section 3 (linear-phase impulse response calculating means, gain correction characteristic calculating means), a phase correction characteristic calculation section 4 (phase correction characteristic calculating means, attenuating means, attenuation determining means), a correction characteristic combining section 5 (filter coefficient calculating means), a filter coefficient calculation section 6 (filter coefficient calculation means), a convolution computation section 7 (convolution computation device), and a tap number changing section 18 (filter tap number changing means).

The gain correction calculation section 3, the phase correction characteristic calculation section 4, the correction characteristic combining section 5, and the filter coefficient calculation section 6 constitute a filter coefficient calculation section 20 (filter coefficient calculation device).

Further, the acoustic characteristic correction apparatus 1 constitutes an acoustic characteristic correction system 15 together with a storage device 8, a microphone 9, an AD converter 10, a source device 11 (audio signal input device), a DA converter 12, an amplifier 13, and a speaker 14 (audio output device).

Figure 2:
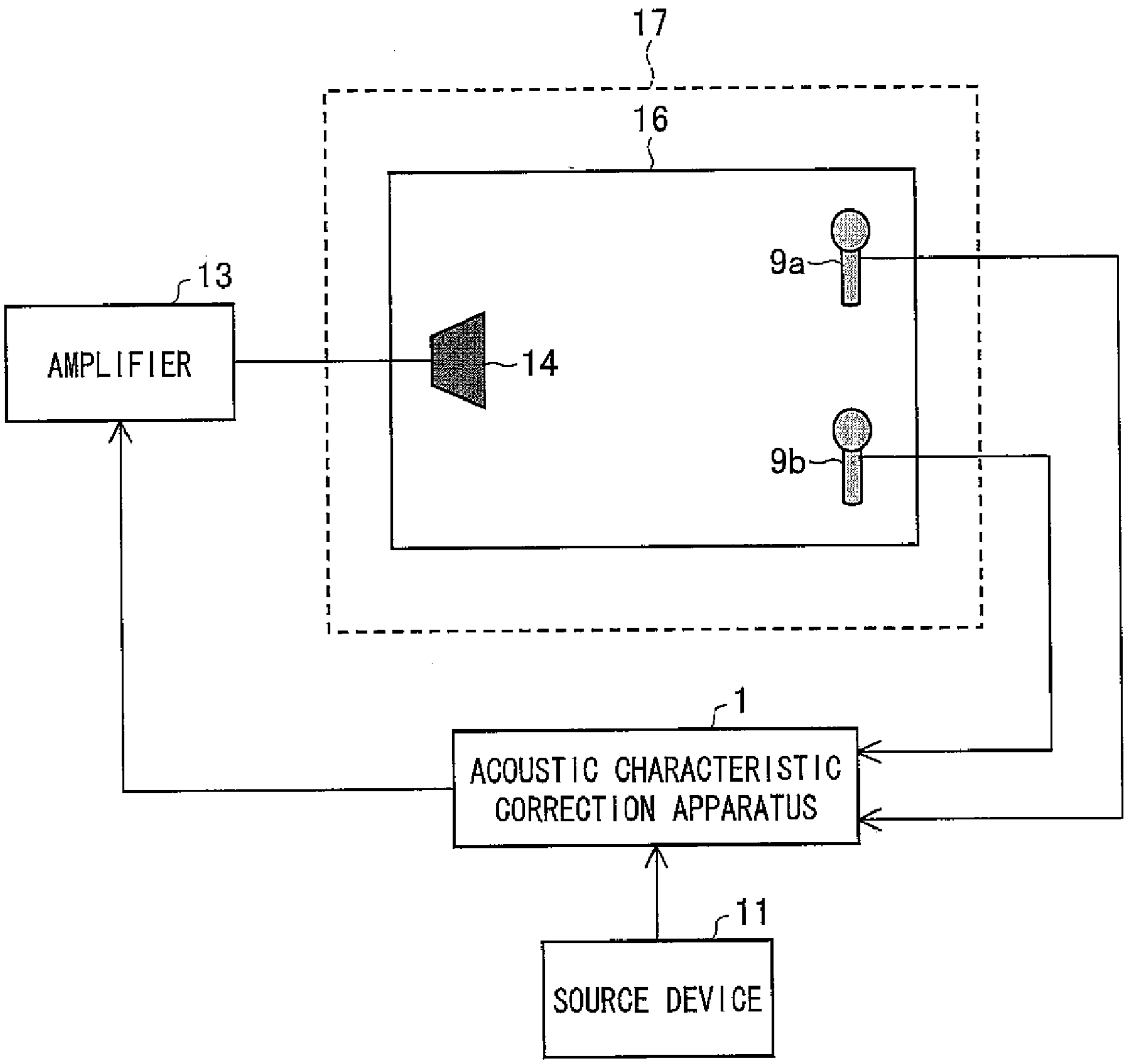
FIG. 2 shows how a reproduction system whose acoustic characteristics are to be corrected in the present embodiment is connected to various types of devices.

FIG. 2 shows how a reproduction system 17 whose acoustic characteristics are to be corrected in the present embodiment is connected to various types of devices. The reproduction system 17 includes the speaker 14 and a listening room 16. FIG. 2 does not illustrate the AD converter 10, the DA converter 12, and the storage device 8. However, as in FIG. 1, those devices are connected to the acoustic characteristic correction apparatus 1 so as to constitute the acoustic characteristic correction system 15. Further, in the example shown in FIG. 2, two microphones 9*a* and 9*b* are disposed. However, the number of microphones may be, but is not particularly limited to, 1.

The acoustic characteristic correction apparatus 1 corrects the acoustic characteristics of the reproduction system 17 including the speaker 14 and the listening room 16. For example, the acoustic characteristic correction apparatus 1 makes it possible to correct time-domain response characteristics such as impulse responses, frequency-domain response characteristics that are obtained by performing a frequency analysis of the impulse responses or the like, and other characteristics. The following describes the operation of each of the components of the acoustic characteristic correction apparatus 1.

The microphone 9 collects sound, converts the sound into an analog electric signal, and outputs the analog electric signal to the AD converter 15. The AD converter 15 converts the analog audio signal, which represents the sound inputted via the microphone 9, into a digital audio signal, and outputs the digital audio signal to the acoustic characteristic measurement section 2.

The acoustic characteristic measurement section 2 measures the acoustic characteristics of the reproduction system 17. That is, the acoustic characteristic measurement section 2 acquires acoustic characteristic data of the reproduction system 17 in accordance with the audio signal inputted via the microphone 9. Then, the acoustic characteristic measurement section 2 supplies the acquired acoustic characteristic data to the gain correction characteristic calculation section 3 and the phase correction characteristic calculation section 4. In the present embodiment, the acoustic characteristic measurement section 2 measures an impulse response in measuring the acoustic characteristics. Although it is preferable that the acoustic characteristic measurement section 2 measure an impulse response by a TSP (time stretched pulse) method or a cross-spectral method, the present invention is not particularly limited to this. For example, the acoustic characteristic measurement section 2 may measure an impulse response by a single pulse. Hereinafter, an impulse response measured by the acoustic characteristic measurement section 2 is referred to as "measured impulse response".

The measurement of an impulse response will be described below more specifically. The following assumes that the measurement is performed by the TSP method. In measuring an impulse response by the TSP method, a TSP signal is used. The TSP signal is stored in the storage device 8. Further, an inverse TSP waveform that is used for converting a response of the TSP signal into an impulse response is also stored in the storage device 8. The inverse TSP waveform is a time reversal of a TSP waveform. Moreover, in measuring an impulse response, the acoustic characteristic measurement section 2 reads out the TSP signal from the storage device 8, and reproduces the TSP signal via the speaker 14. The sound represented by the reproduced TSP signal is collected by the microphone 9, and a collected sound waveform is stored in the storage device 8. Then, a measured impulse response waveform can be obtained by performing a computation of convolution of the collected sound waveform stored in the storage device 8 and the inverse TSP signal. The computation of convolution may be performed by the convolution computation section 7.

Although FIG. 2 shows the arrangement in which the two microphones 9*a* and 9*b* are disposed, it is not necessary to measure an impulse response with two microphones, and the arrangement may be, but is not particularly limited to, such an arrangement as to measure an impulse response with either of the microphones 9*a* and 9*b*.

The gain correction characteristic calculation section 3 creates a gain correction FIR filter in accordance with the acoustic characteristic data (hereinafter referred to as "measured impulse response data") supplied from the acoustic characteristic measurement section 2. The gain correction FIR filter is a filter that corrects only an amplitude-frequency characteristic without changing a phase-frequency characteristic. More specifically, the creation of the gain correction FIR filter here means calculation of a frequency characteristic of the gain correction FIR filter (such a frequency characteristic being hereinafter referred to as "gain correction characteristic"). Then, the gain correction characteristic calculation section 3 outputs, to the correction characteristic combining section 5, data representing the gain correction characteristic. The gain correction characteristic calculation section 3 will be described more in detail later.

The phase correction characteristic calculation section 4 creates a phase correction FIR filter in accordance with the acoustic characteristic data (i.e., measured impulse response data) supplied from the acoustic characteristic measurement section 2. The phase correction FIR filter is a filter that corrects only a phase-frequency characteristic without changing an amplitude-frequency characteristic. More specifically, the creation of the phase correction FIR filter here means calculation of a frequency characteristic of the phase correction FIR filter (such a frequency characteristic being hereinafter referred to as "phase correction characteristic"). Then, the phase correction characteristic calculation section 4 outputs, to the correction characteristic combining section 5, data representing the phase correction characteristic.

The correction characteristic combining section 5 combines the phase correction characteristic with the gain correction characteristic, thereby creating a FIR filter that corrects the acoustic characteristics of the reproduction system 17. More specifically, the creation of the filter here means calculation of a frequency characteristic of the filter (such a frequency characteristic being hereinafter referred to as "synthetic correction characteristic"). That is, the correction characteristic combining section 5 calculates the synthetic correction characteristic by combining the gain correction characteristic with the phase correction characteristic, and outputs, to the filter coefficient calculation section 6, data representing the synthetic correction characteristic.

The filter coefficient calculation section 6 performs inverse Fourier transformation (more specifically, IDEF or IFFT) of the data representing the synthetic correction characteristic, thereby calculating impulse responses corresponding to the synthetic correction characteristic. Time-axis level values of the impulse responses corresponding to the synthetic correction characteristic are set as coefficients of the FIR filter that corrects the acoustic characteristics of the reproduction system 17. The filter coefficient calculation section 6 stores, in the storage device 8, data representing the time-axis level values serving as coefficients of the FIR filter. Further, the filter coefficient calculation section 6 can directly output, to the convolution computation section 7, the data representing the coefficients of the FIR filter.

The convolution computation section 7 imparts the synthetic correction characteristic to an audio signal inputted from the source device 11, i.e., performs a computation of convolution of the coefficients of the FIR filter and the audio data, and outputs, to the DA converter 12, the sound signal to which the synthetic correction characteristic has been imparted.

The DA converter 12 converts, into an analog audio signal, the digital audio signal inputted from the convolution computation section 7, and outputs the analog audio signal to the amplifier 13. The amplifier 13 amplifies the analog audio signal inputted from the DA converter 12, and outputs the analog sound signal to the speaker 14. The speaker 14 converts, into sound, the amplified analog audio signal inputted from the amplifier 13, and outputs the sound.

The functions of each of the components of the acoustic characteristic correction apparatus 1 are realized by causing a CPU to cooperate with an operating system in performing processes in accordance with various types of programs loaded in a memory. Alternatively, the functions of each of the components of the acoustic characteristic correction apparatus 1 may be partially or wholly realized without an operating system solely by a CPU and various types of programs loaded in a memory. Further, the operating system and the various types of programs are stored in the storage device 8, and are read out and executed by the CPU. Similarly, various types of data for use in processes that are executed by the acoustic characteristic correction apparatus 1 are also stored in the storage device 8, and are read out by the CPU as needed.

Figure 3:
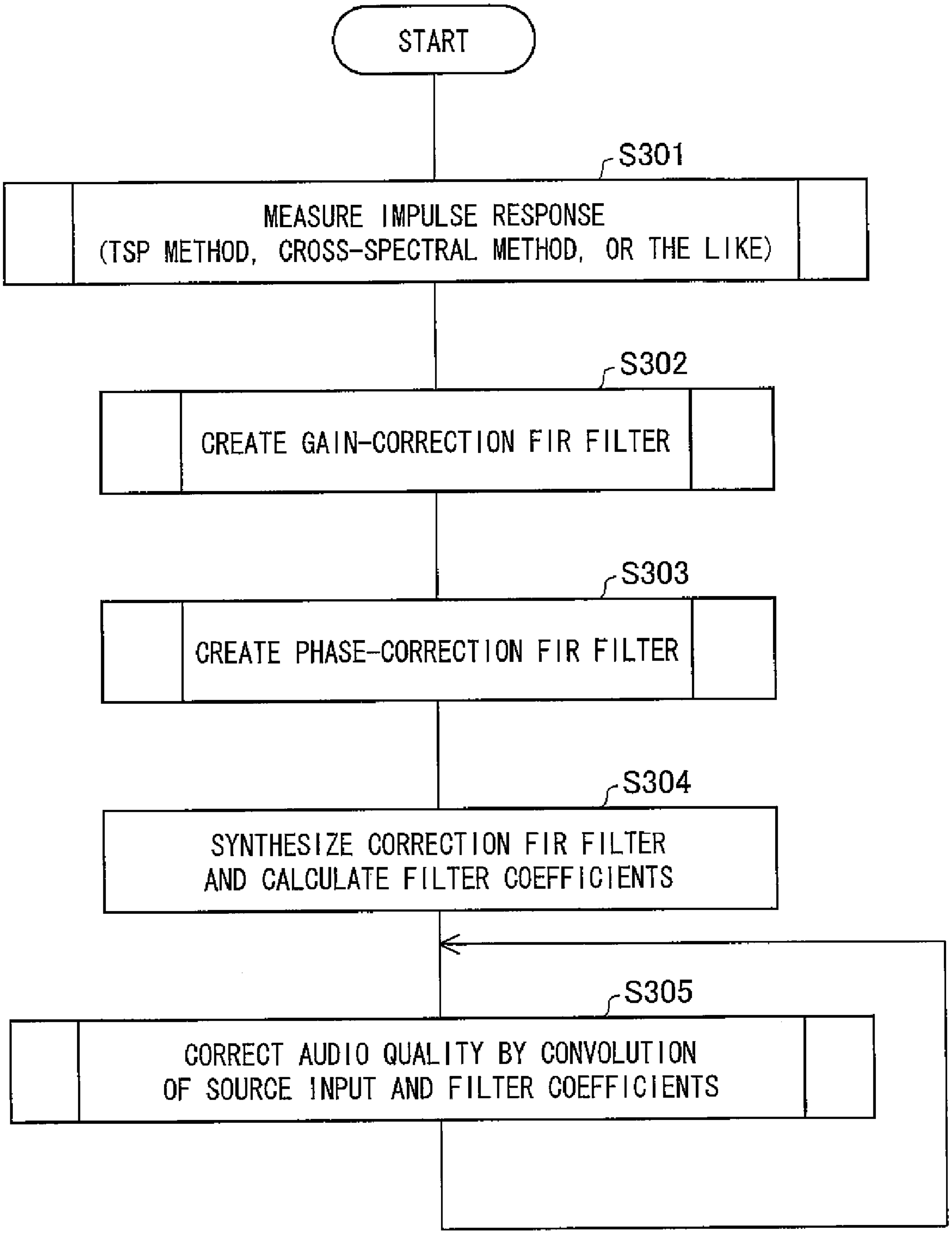
FIG. 3 is a flow chart showing an outline of the flow of a process that is performed by the acoustic characteristic correction apparatus according to the present embodiment in correcting acoustic characteristics.

FIG. 3 is a flow chart showing an outline of the flow of a process that is performed by the acoustic characteristic correction apparatus 1 according to the present embodiment in correcting acoustic characteristics. An outline of the flow of a process that is performed by the acoustic characteristic correction apparatus 1 in correcting acoustic characteristics will be described below with reference to FIG. 3.

First, the acoustic characteristic measurement section 2 measures impulse responses (i.e., the aforementioned measured impulse responses) by the TSP method or the cross-spectral method (S301).

Next, the gain correction characteristic calculation section 3 creates a gain correction FIR filter in accordance with the impulse responses measured in S301 (S302). More specifically, the gain correction characteristic calculation section 3 calculates the gain correction characteristic.

Next, the phase correction characteristic calculation section 4 creates a phase correction FIR filter in accordance with the impulse responses measured in S301 (S302). More specifically, the phase correction characteristic calculation section 4 calculates the phase correction characteristic.

Next, the correction characteristic combining section 5 calculates a synthetic correction characteristic by combining, with the gain correction characteristic calculated in S302, the phase correction characteristic calculated in S303. The filter coefficient calculation section 6 calculates filter coefficients of a correction FIR filter in accordance with the synthetic correction characteristic (S304).

Then, the convolution operation section 7 repeats a computation of convolution of an audio signal inputted from the source device 11 and the filter coefficients calculated in S304 (S305). This results in an adjustment of the quality of sound that is reproduced in accordance with the audio signal. That is, the acoustic characteristic correction apparatus 1 corrects the acoustic characteristics of the reproduction system 17.

(Gain Correction Characteristic Calculation Section 3)

The gain correction characteristic calculation section 3 performs Fourier transform (more specifically, DFT or FFT) of the acoustic characteristic data supplied from the acoustic characteristic measurement section 2 (i.e., data representing the measured impulse responses) so as to convert the acoustic characteristic data into frequency characteristic data representing a frequency characteristic Hsp of the reproduction system 17.

Figure 4:
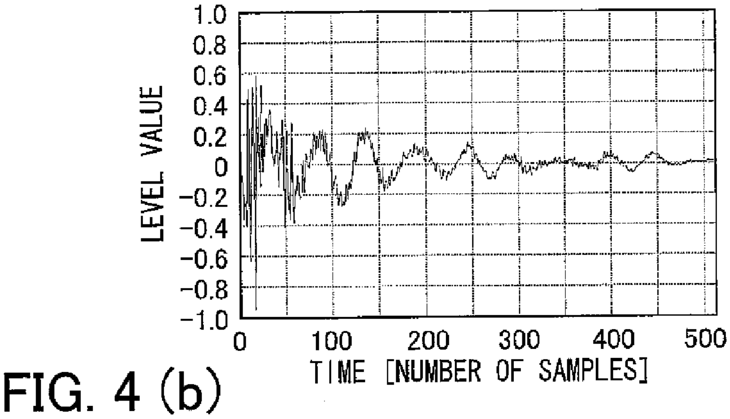
FIGS. 4(*a*) through 4(*d*) show various types of characteristics found in cases where a gain correction characteristic is calculated by a gain correction characteristic calculation section.
Figure 4:
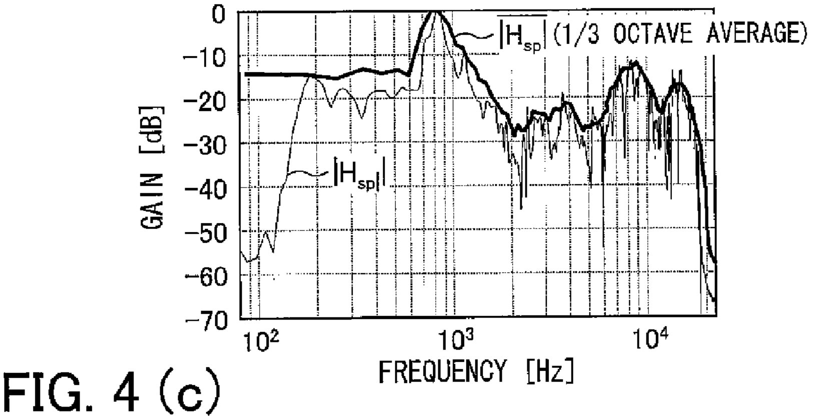
Figure 4:
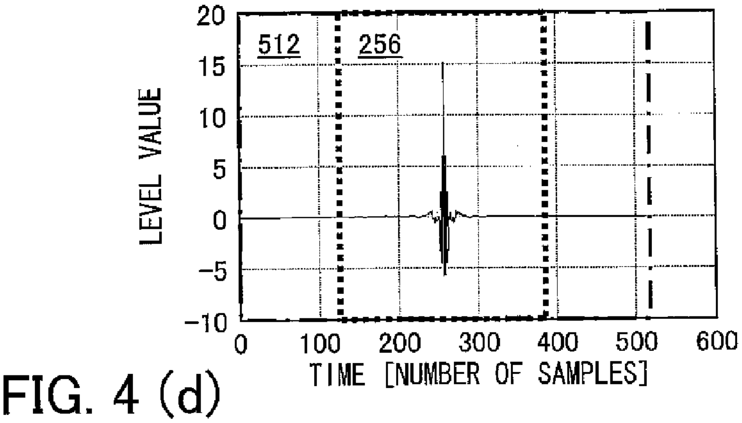
Figure 4:
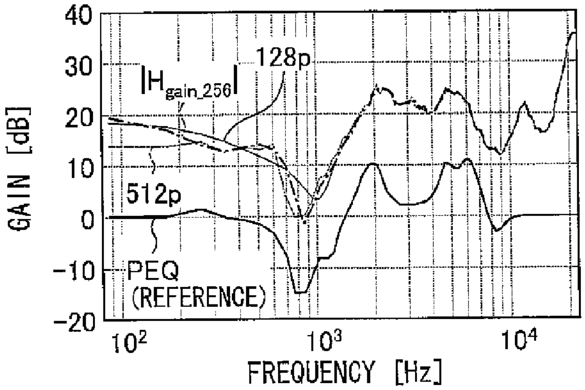

FIGS. 4(*a*) through 4(*d*) show various types of characteristics found in cases where the gain correction characteristic is calculated by the gain correction characteristic calculation section 3. FIG. 4(*a*) shows measured impulse responses that have been sampled. FIG. 4(*b*) shows a frequency characteristic of the measured impulse responses. FIG. 4(*c*) shows impulse responses corresponding to an inverse characteristic of the frequency characteristic of the measured impulse responses. FIG. 4(*d*) shows the gain correction characteristic calculated by the gain correction characteristic calculation section 3.

The present embodiment assumes here that the number of measured impulse responses sampled by the gain correction characteristic calculation section 3 is 512. That is, the measured impulse responses of FIG. 4(*a*) are represented by 512 pieces of sampling data. Moreover, the gain correction characteristic calculation section 3 performs Fourier transform of these 512 pieces of sampling data that represent the measured impulse responses, thereby yielding the data representing the frequency characteristic Hsp.

Next, the gain correction characteristic calculation section 3 calculates a frequency characteristic |Hsp| (corresponding to the "gain characteristic" as set forth in the claims and hereinafter referred to as "gain frequency characteristic |Hsp|") regarding the gain of the frequency characteristic Hsp. The gain frequency characteristic |Hsp| is expressed as an absolute value of the frequency characteristic Hsp. More specifically, the data representing the frequency characteristic Hsp is data corresponding to a complex number (such data being hereinafter referred to as "complex format data"), and consists of a real part and an imaginary part. Then, the gain correction characteristic calculation section 3 calculates, as the gain frequency characteristic |Hsp|, the absolute value of the complex format data representing the frequency characteristic Hsp. The gain frequency characteristic |Hsp| is expressed by Mathematical Formula 1:

$$|H_{SP}|=\sqrt{H_{SP}{}^{*}\cdot H_{SP}}$$

where Hsp* is the conjugate complex number of the frequency characteristic Hsp. FIG. 4(*b*) shows the gain frequency characteristic |Hsp|.

Next, the gain correction characteristic calculation section 3 calculates an average gain characteristic |Hsp¯| by averaging the gain frequency characteristic |Hsp| for each predetermined bandwidth (e.g., ⅓ octave or ⅙ octave). FIG. 4(*b*) shows the average gain characteristic |Hsp¯|. As shown in FIG. 4(*b*), the average gain characteristic |Hsp¯| indicates a frequency characteristic smoothed as compared with the gain frequency characteristic |Hsp|. The averaging of the gain frequency characteristic |Hsp| for ⅓ octave or ⅙ octave makes it possible to obtain a gain frequency characteristic similar to a human auditory characteristic. The present invention is not particularly limited to this. For example, the aftermentioned inverse gain frequency characteristic Hgain may be calculated instead of the average gain frequency characteristic |Hsp¯| by using the gain frequency characteristic |Hsp|.

Furthermore, the gain correction characteristic calculation section 3 performs a computation of 1/|Hsp¯|, thereby calculating the inverse gain frequency characteristic Hgain (=1/|Hsp¯|) indicating an inverse characteristic of the average gain frequency characteristic |Hsp¯|. That is, Hgain(k) is calculated by Hgain(k)=1/|Hsp¯(k)|, where k is the discrete frequency. The inverse gain frequency characteristic Hgain is also represented by complex format data whose imaginary part data is entirely 0. The inverse gain frequency characteristic Hgain corresponds to the "inverse characteristic of a gain characteristic of the reproduction system" as set forth in the claims.

Then, the gain correction characteristic calculation section 3 performs inverse Fourier transform of the inverse gain frequency characteristic Hgain, thereby yielding complex format data. The complex format data thus obtained through the inverse Fourier transform has a real part that represents impulse responses corresponding to the inverse gain frequency characteristic Hgain.

The data representing the impulse responses corresponding to the inverse gain frequency characteristic Hgain serves as coefficients of a FIR filer that corrects a response characteristic regarding the gain of the reproduction system 17. Moreover, the data representing the impulse responses corresponding to the inverse gain frequency characteristic Hgain correspond to the "impulse response corresponding to a linear-phase filter" as set forth in the claims.

Moreover, the FIR filter corresponding to the inverse gain frequency characteristic Hgain serves as a filter that corrects only an amplitude-frequency characteristic without changing a phase-frequency characteristic. Such a FIR filter is generally referred to as "linear-phase FIR filter".

Since the number measured impulse responses sampled by the gain correction characteristic calculation section 3 is 512 as described above, the number of pieces of data that represent the impulse responses corresponding to the inverse gain frequency characteristic Hgain calculated by the gain correction characteristic calculation section 3 is also 512. The range of impulse responses surrounded by the dashed line of FIG. 4(*c*) is represented by 512 pieces of data.

Here, the gain correction characteristic calculation section 3 clips, in accordance with the specifications of a DSP that performs a computation of convolution, the impulse responses corresponding to the inverse gain frequency characteristic Hgain. The clipping of the impulse responses will be described below more specifically.

In the present embodiment, the number of taps of the FIR filter is limited to 256 by the specifications of the convolution computation section 7, which corresponds to a DSP. Therefore, the number of taps of the FIR filter to be calculated is set to 256, so that the number of pieces of impulse response data that can be used finally as filter coefficients of the FIR filter is limited to 256. In view of this, the gain correction characteristic calculation section 3 takes out, from the 512 pieces of data that represent the impulse responses corresponding to the inverse gain frequency characteristic Hgain, continuous-time 256 pieces of data centered around a peak value (maximum or minimum value) (such pieces of data being hereinafter referred to as "clipped data"). That is, the gain correction characteristic calculation section 3 takes out the 256 pieces of data that represent the region of impulse responses surrounded by the dotted line of FIG. 4(*c*). As shown in FIG. 4(*c*), the impulse responses corresponding to the inverse gain frequency characteristic Hgain forms a waveform whose amplitude is centrally concentrated and which converges at both ends.

It should be noted that the set number of filter taps may be stored in the storage section 8 and read out from the storage section 8 by the gain correction characteristic calculation section 3.

Figure 16:
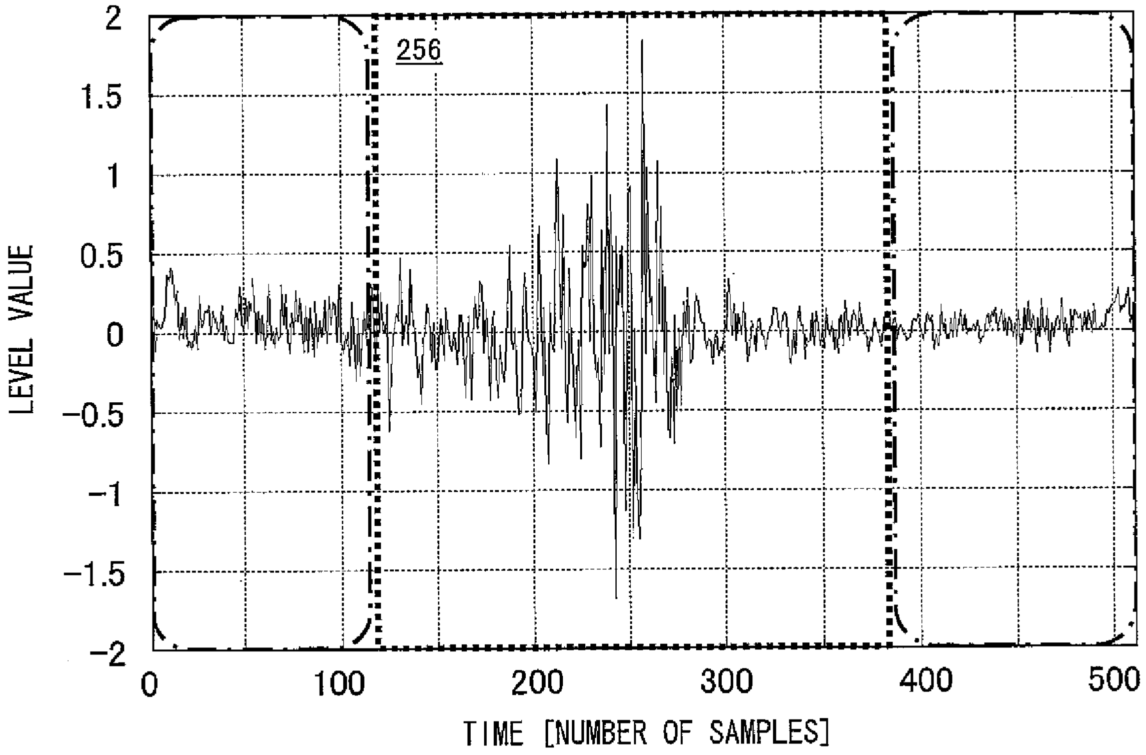
FIG. 16 shows inverted filter impulse responses calculated in accordance with measured impulse responses (the number of measured impulse responses sampled: 512).

As already described as a problem, in cases where impulse responses corresponding to an ordinary inverted filter are calculated, the result of the calculation contains information on a phase-frequency characteristic (phase characteristic) as well as a gain-frequency characteristic (gain characteristic). In such a case, as shown in FIG. 16, the calculated impulse responses form a waveform whose amplitude is entirely scattered and which does not converge at either end. Therefore, for example, in cases where the 256 pieces of data centered around the peak value are clipped from the 512 pieces of data that represent the impulse responses, that region of the data which is surrounded by the dashed line of FIG. 16 is discarded. In this case, the amplitude (FIR filter coefficients) of that discarded region of the impulse response which is surrounded by the dashed line of FIG. 16 is not small enough to be ignored as compared with the amplitude (FIR filter coefficients) of the whole impulse responses. Therefore, even when the calculated FIR filter is used to correct audio quality, the corrected impulse responses and the corresponding frequency characteristic contain a large number of errors.

On the other hand, the impulse responses corresponding to the inverse gain frequency characteristic calculated by the gain correction characteristic calculation section 3 of the acoustic characteristic correction apparatus 1 according to the present invention correspond to a linear-phase FIR filter as described above, and from a waveform, as shown in FIG. 4(*c*), whose amplitude is centrally concentrated and which converges at both ends.

Therefore, although that range of the impulse response data which is not surrounded by the dotted line of FIG. 4(*c*) is discarded in cases where the 256 pieces of data centered around the peak value is clipped, the amplitude (FIR filter coefficients) of the discarded impulse responses is small enough to be ignored as compared with the amplitude (FIR filter coefficients) of the whole impulse responses. That is, the clipping of the impulse responses corresponding to the inverse gain frequency characteristic Hgain discards small amplitude (FIR filter coefficients) as compared with an impulse response of an ordinary inverted filter. This reduces acoustic correction errors caused by the influence of the clipping of the impulse responses.

However, a FIR filter prepared by using only gain characteristic information can improve transfer characteristic, but cause a phase lag within a time domain. In view of this, a FIR filter for correcting only a phase characteristic is combined within a frequency domain with a FIR filter, corresponding to the inverse gain frequency characteristic Hgain, which has been clipped.

Therefore, the impulse responses represented by the 256 pieces of clipped data is subjected to Fourier transform so as to be converted again into information within the frequency domain. That is, the gain correction characteristic calculation section 3 performs Fourier transform of the 256 pieces of clipped data, and then converts the 256 pieces of clipped data into complex format data representing a frequency characteristic Hgain_256.

Then, the gain correction characteristic calculation section 3 calculates, in the same manner as the gain frequency characteristic |Hsp|, a frequency characteristic |Hgain_256| regarding the gain of the frequency characteristic Hgain_256 (such a frequency characteristic |Hgain_256| being hereinafter referred to as "gain frequency characteristic |Hgain_256|").

FIG. 4(*d*) shows the gain frequency characteristic |Hgain_256|. The gain frequency characteristic |Hgain_256| indicates a gain characteristic exactly opposite to the gain frequency characteristic shown in FIG. 4(*b*). Further, FIG. 4(*d*) also shows examples of gain frequency characteristics obtained by setting the number of taps to 128 and 512.

It should be noted here that the gain frequency characteristic |Hgain_256| corresponds to a FIR filter that corrects a gain characteristic of the reproduction system 17. That is, the gain correction characteristic calculation section 3 calculates the gain frequency characteristic |Hgain_256| as a gain correction characteristic.

In the present embodiment, the number of FIR filter taps that are finally used for a computation of convolution with audio data (i.e., the number of filter coefficients) is preset in the storage device 8. That is, the gain correction characteristic calculation section 3 clips, in accordance with the number of taps read out from the storage device 8, the impulse responses corresponding to the inverse gain frequency characteristic Hgain. The number of FIR filter taps that are used for a computation of convolution may be arranged to be able to be changed or specified optionally by a user, and is not particularly limited.

(Phase Correction Characteristic Calculation Section 4)

The phase correction characteristic calculation section 4 performs Fourier transform of the acoustic characteristic data (i.e., data representing the measured impulse responses) supplied from the acoustic characteristic measurement section 2, thereby yielding frequency characteristic data representing a frequency characteristic Hsp_w of the reproduction system.

Figure 5:
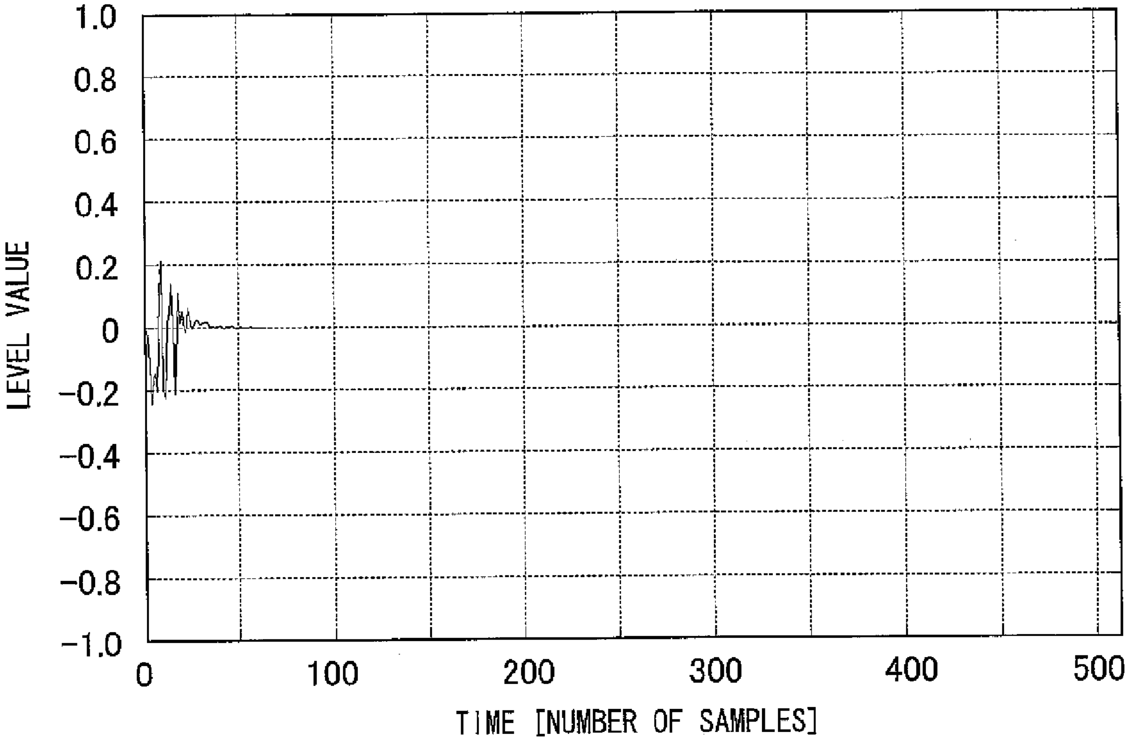
FIG. 5 shows measured impulse responses that have been sampled by a phase correction characteristic calculation section.

FIG. 5 shows measured impulses sampled by the phase correction characteristic calculation section 4.

In the present embodiment, the number of filter taps is set to 256, and the phase correction characteristic calculation section 4 reads out the set number of taps from the storage device 8. Then, a calculation of a phase correction characteristic requires 256 pieces of data that correspond to the measured impulses.

The present embodiment assumes here that the number of measured impulse responses sampled by the phase correction characteristic calculation section 4 is 64, which is ¼ of the number of filter taps (256). The values of the remaining 192 pieces of data necessary for Fourier transform are set to 0. That is, the phase correction characteristic calculation section 4 uses, as data representing the measured impulse responses, 256 pieces of data that include (i) data obtained by applying an exponential attenuation window to the 64 pieces of sampling data and (ii) the 192 pieces of data whose values have been set to 0.

The phase correction characteristic calculation section 4 does not need to be arranged to clip measured impulse response data, but may be arranged to use all the measured impulse response data by setting the number of measured impulse responses sampled to 256. The phase correction characteristic calculation section 4 is not particularly limited to these arrangements.

Further, in the present embodiment, in order to reduce alias phenomena caused by the influence of circular convolution, the phase correction characteristic calculation section 4 applies an exponential attenuation window to the measured impulse responses. Details of the circular convolution will be described later. The impulse responses of FIG. 5 are represented by data obtained by applying the exponential attenuation window to the 64 pieces of data obtained by sampling the measured impulse responses.

The exponential attenuation window for reducing alias phenomena is represented, for example, by a formula $w(n)=e^{d\cdot n/64}$ (n=0, 1, . . . , 63). Moreover, in the present embodiment, hsp_w(n) is calculated by applying the exponential attenuation window to the measured impulse responses (indicated by hsp(n)) that have been sampled, and a phase correction characteristic is calculated by using hsp_w(n) instead of hsp(n). The hsp_w(n) is calculated by a computation of hsp_w(n)=hsp(n)·w(n) (n=0, 1, . . . 63). However, the exponential attenuation window does not need to be used. The present invention is not particularly limited to this.

Moreover, the phase correction characteristic calculation section 4 performs Fourier transform of these 256 pieces of data that correspond to the measured impulse responses, thereby yielding data representing the frequency characteristic Hsp_w. The data thus yielded is complex format data consisting of real-part data and imaginary-part data.

Next, the phase correction characteristic calculation section 4 performs a computation of 1/Hsp_w, thereby calculating a frequency characteristic Htemp (=1/Hsp_w) corresponding to an inverted filter of the reproduction system 17. When the discrete frequency is k, the calculation is performed by a computation of Htemp(k)=Hsp_w*(k)/(Hsp_w*(k)·Hsp_w(k)), where Hsp_w*(k) is a conjugate complex number of Hsp_w(k). The complex format data representing the frequency characteristic Htemp has real-part data and imaginary-part data each of which has a value set therefor. It should be noted here that the frequency characteristic Htemp corresponds to the "inverse characteristic of a frequency characteristic of the reproduction system" as set forth in the claims.

Furthermore, the phase correction characteristic calculation section 4 performs a computation of Htemp/|Htemp|, normalizes the frequency characteristic Htemp of the inverted filter, and calculates a frequency characteristic Hap (=Htemp/|Htemp|). It should be noted here that the frequency characteristic Hap is represented by complex format data, and a gain frequency characteristic |Hap| calculated as an absolute value of the complex format data becomes 1 with respect to all the frequencies, so that the gain becomes constant at all the frequencies. That is, the frequency characteristic Hap becomes a frequency characteristic of an all-pass filter, i.e., of a filter that corrects only a phase-frequency characteristic without changing an amplitude-frequency characteristic.

The frequency characteristic Hap corresponds to a FIR filter that corrects a phase characteristic of the reproduction system 17. That is, the phase correction characteristic calculation section 4 calculates the frequency characteristic Hap as a phase correction characteristic.

The following describes the details of circular convolution. As described above, in the present embodiment, the number of FIR filter taps is limited to 256 by the specifications of the convolution computation section 7. Therefore, the number of FIR filter taps (i.e., number of filter coefficient) that are finally combined is 256, and the number of pieces of data that represent measured impulse responses necessary for performing Fourier transform for calculating the frequency characteristic Hsp_w is also 256.

Incidentally, in cases where an inverted filter is calculated, impulse responses corresponding to the inverted filter are calculated by performing inverse Fourier transform of an inverted characteristic of a frequency characteristic found by performing Fourier transform of the measured impulse responses. More specifically, the Fourier transform here refers to discrete Fourier transform (DFT) using fast Fourier transform (FFT). The impulse responses thus calculated in correspondence with the inverted filter correspond to a single periodic sequence of numbers obtained by repeating and overlapping a nonperiodic sequence of numbers by shifting the nonperiodic sequence of numbers in increments of N points. In cases where the FFT length is not set to be sufficiently long, an alias phenomenon occurs due to the influence of circular convolution.

Figure 6:
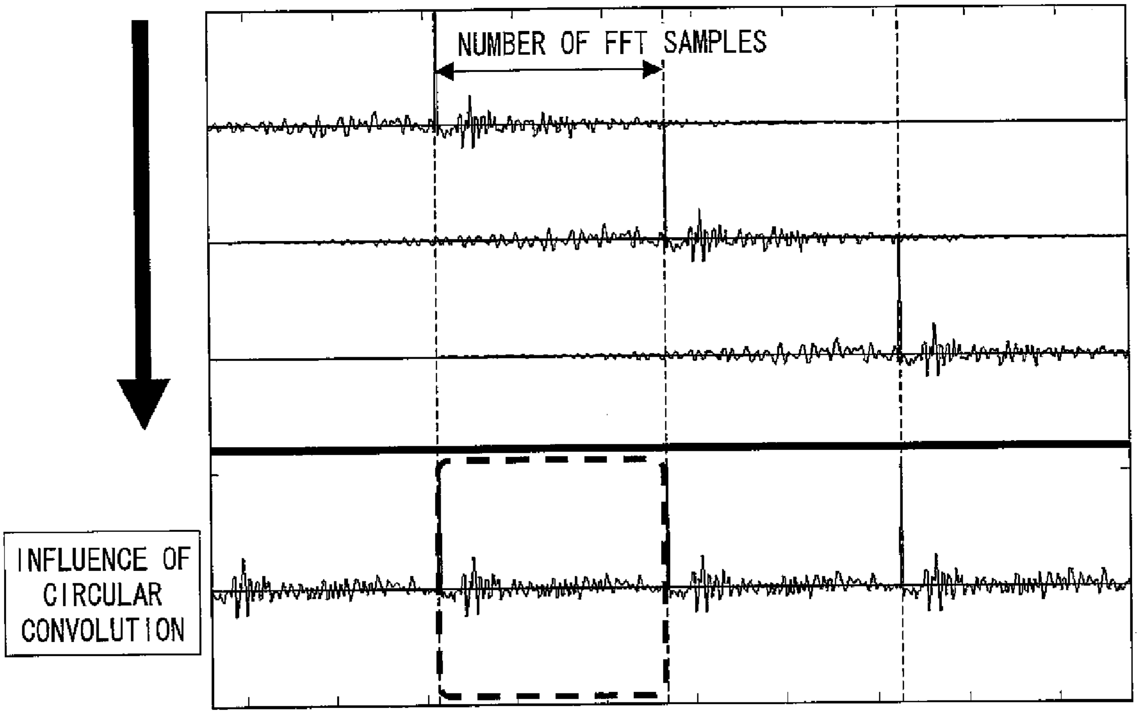
FIG. 6 illustrates an alias phenomenon.

FIG. 6 illustrates an alias phenomenon. The portion surrounded by the dotted line of FIG. 6 indicates a single periodic sequence of numbers, i.e., impulse responses corresponding to an inverted filter, and indicates how positive time and negative time reside with each other.

Moreover, in order to prevent an alias phenomenon from occurring due to the influence of circular convolution, it is necessary to set the FFT length to be sufficiently long so that a response that has been obtained by performing inverse Fourier transform has an interval of 0.

In view of this, in the present embodiment, the number of measured impulse responses sampled is set to 64 with respect to 256, which is the required number of FIR filter taps (i.e., corresponding to the FFT length), and the FFT length is set to be relatively sufficiently long by applying the exponential attenuation window to the measured impulses so that the reverberant energy of an impulse response at the 64th sampling point of the measured impulse responses is attenuated to be smaller than a preset threshold value of −60 dB. It should be noted that the values of the remaining 192 pieces of data necessary for Fourier transform are set to 0.

That is, as described above, in the present embodiment, hsp_w(n) is calculated by applying the exponential attenuation window to the measured impulse responses (represented as hsp(n)) that have been sampled, and the phase correction characteristic is calculated by using hsp_w(n) instead of hsp (n).

The exponential attenuation window is represented, for example, by the formula $w(n)=e^{d \cdot n/64}$ (n=0, 1, . . . , 63). Moreover, the reverberant energy of an impulse response is calculated, for example, from a ratio between the energy of the whole measured impulse responses and the energy of the measured impulse response at a given sampling point by square integration for use in measuring reverberation time. More specifically, the reverberant energy can be evaluated by Mathematical Formula (2):

$$S = 10 \cdot \log_{10}\left((\text{hsp\_w}(63))^2 \Big/ \sum_{n=0}^{63} (\text{hsp\_w}(n))^2\right)$$

The influence of an alias phenomenon is small in cases where S calculated by Mathematical Formula (2) is not more than −60. Moreover, the present embodiment uses Mathematical Formula (2) to evaluate whether or not the reverberant energy of hsp_w(n) for use in calculating the phase correction characteristic is sufficiently attenuated at a sampling point whose number corresponds to ¼ of the number of taps.

It should be noted here that in cases where the attenuation of the reverberant energy of hsp_w(n) is evaluated, the d of the exponential attenuation window is adjusted so that the influence of an alias becomes small, i.e., so that S is not more than −60. When d=0, the exponential attenuation window is virtually non-existent. However, when d is too small, an approximation of a δ function is made, i.e., the phase of Hsp_w comes close to 0, so that phase information is reduced. The value "−60" is a general-purpose reference value calculated from the result of the study, and the present invention is not limited to this value.

This makes it possible to reduce alias phenomena caused by the influence of circular convolution in impulse responses obtained by performing inverse Fourier transform of a synthetic correction characteristic that is to be finally synthesized by the correction characteristic combining section 5.

(Synthetic Inverted Filter)

In the acoustic characteristic correction apparatus 1, the correction characteristic combining section 5 calculates a synthetic correction characteristic H by combining (i) the gain correction characteristic calculated by the gain correction characteristic calculation section 3 with (ii) the phase correction characteristic calculated by the phase correction characteristic calculation section 4. More specifically, the correction characteristic combining section 5 calculates the synthetic correction characteristic H by performing a computation of |Hgain_256|·Hap. That is, the correction characteristic combining section 5 performs a computation of H(k)=|Hgain_256(k)|·Hap(k) in order to calculate a synthetic correction characteristic H(k), where k is the discrete frequency.

Figure 7:
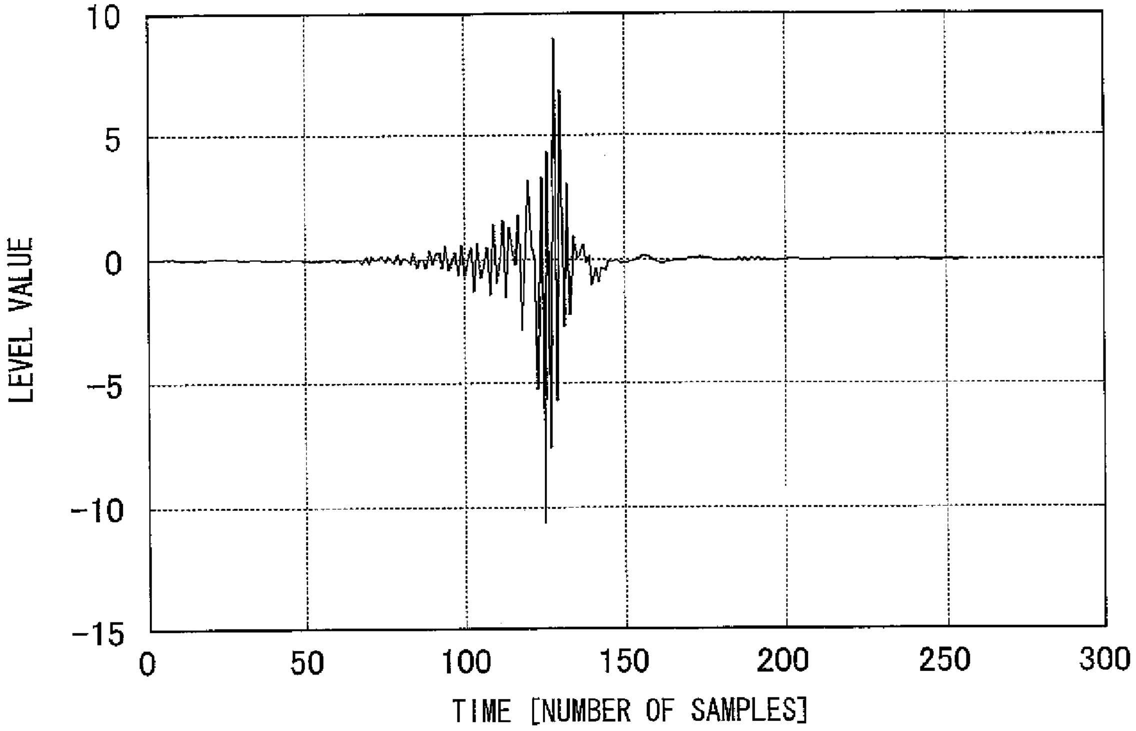
FIG. 7 shows impulse responses corresponding to a synthetic correction characteristic.

Then, the filter coefficient calculation section 6 performs inverse Fourier transform of the synthetic correction characteristic H calculated by the correction characteristic combining section 5, thereby calculating impulse responses corresponding to the synthetic correction characteristic H. FIG. 7 shows the impulse responses corresponding to the synthetic correction characteristic H. The number of pieces of complex format data that represent |Hgain_256| and the number of pieces of complex format data that represent Hap are both 256. Therefore, the number of pieces of complex format data that obtained by combining these pieces of complex format data and the number of pieces of data that represent impulse responses calculated by performing inverse Fourier transform of the complex format data are also 256.

Moreover, the acoustic characteristic correction apparatus 1 according to the present invention corrects the acoustic characteristics of the reproduction system 17 by using a FIR filter whose filter coefficients are data representing the impulse responses corresponding to the synthetic correction characteristic (such a FIR filter corresponding to the "reproduction characteristic correction filter" as set forth in the claims and being hereinafter referred to as "synthetic inverted filter"). More specifically, the convolution computation section 7 performs a computation of convolution of (i) audio data inputted from the source device 11 and (ii) filter coefficients of the synthetic inverted filter, so that the synthetic correction characteristic is imparted to the audio data. The synthetic inverted filter makes it possible to correct both gain and phase characteristics of the reproduction system 17.

Further, as described above, the convolution computation section 7, which corresponds to a DSP, can process 256 FIR filter taps. Meanwhile, since the number of filter coefficients of the synthetic inverted filter is also 256, it is possible for the convolution computation section 7 to perform a computation of convolution of the synthetic inverted filter.

Furthermore, as shown in FIG. 7, the impulse responses of the synthetic inverted filter as calculated by the acoustic characteristic correction apparatus 1 according to the present invention forms waveform that is centrally concentrated as compared with a case where 256 samples are clipped from impulse responses of a typical inverted filter as shown in FIG. 16. This reduces errors caused after correction by the influence of circular convolution.

Figure 8:
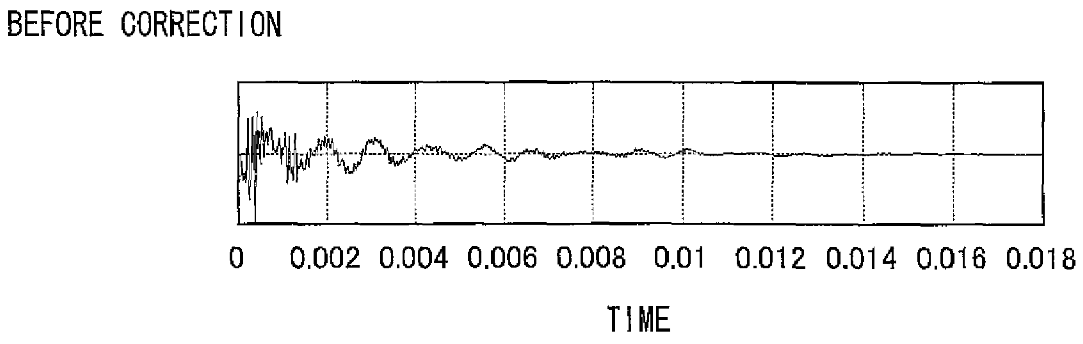
FIGS. 8(*a*) and 8(*b*) show impulse responses produced in a reproduction system.
Figure 8:
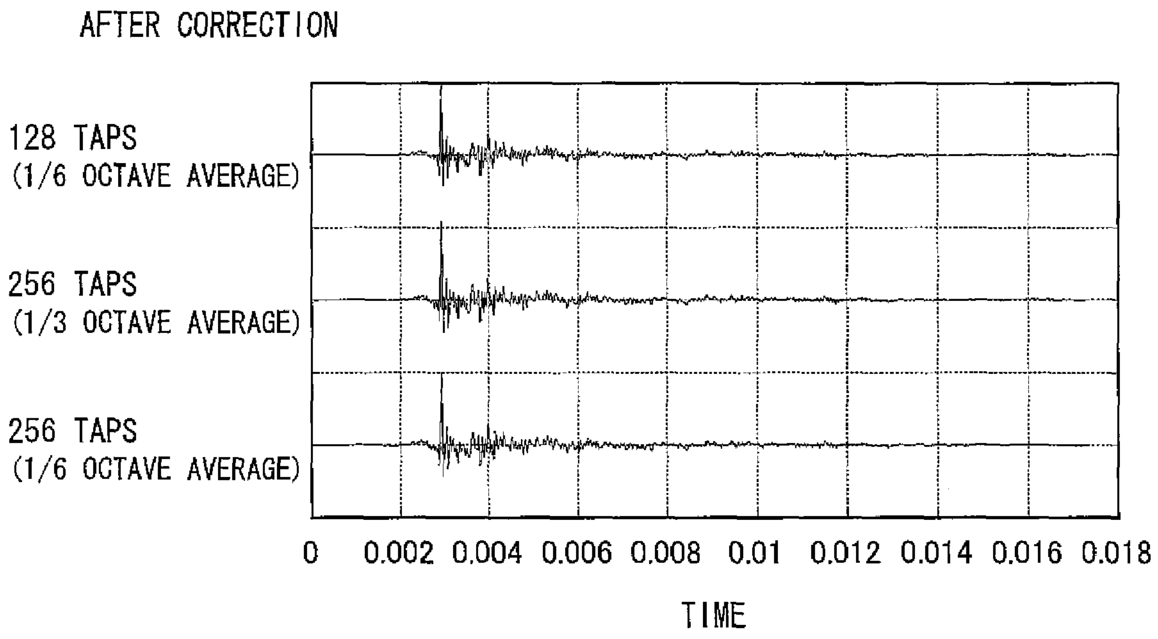

FIGS. 8(*a*) and 8(*b*) show impulse responses produced in the reproduction system 17. FIG. 8(*a*) shows impulse responses produced in cases where no corrections are made by the synthetic inverted filter, and FIG. 8(*b*) shows impulse responses produced in cases where corrections are made by the synthetic inverted filter. It should be noted that FIG. 8(*b*) shows examples of cases where the number of taps of the synthetic inverted filter is set to 128 and 256. Further, FIG. 8(*b*) shows impulse responses produced in cases where a correction is made by a synthetic inverted filter that calculates a ⅓ octave average of the gain frequency characteristic |Hsp| and impulse responses produced in cases where a correction is made by a synthetic inverted filter that calculates a ⅙ octave average of the gain frequency characteristic |Hsp|, in both of which cases the number of taps is 256.

Whereas the uncorrected impulse responses of FIG. 8(*a*) form a waveform different in cycle from a unit impulse, the corrected impulse responses of FIG. 8(*b*) form waveforms similar to a unit impulse having a sharp rising edge. That is, the synthetic inverted filter corrects the impulse responses so that the impulse responses form a unit impulse. Further, also in cases where the number of taps of the synthetic inverted filter is 128, which is smaller than 256, i.e., in cases where there are more pieces of data that are discarded when the gain correction characteristic is calculated by the gain correction characteristic calculation section 3, impulse responses are produced which are equal to the impulse responses produced when the number of taps is 256.

Figure 9:
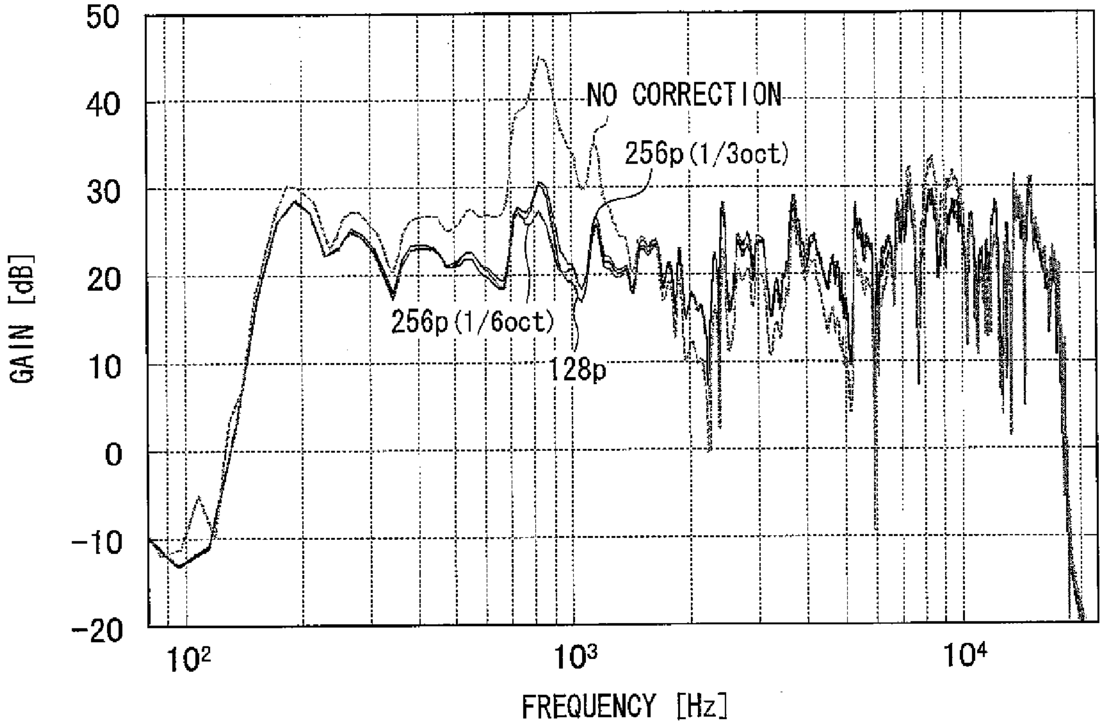
FIGS. 9(*a*) and 9(*b*) show gain-frequency characteristics of the reproduction system in cases where a correction is made by the synthetic inverted filter.
Figure 9:
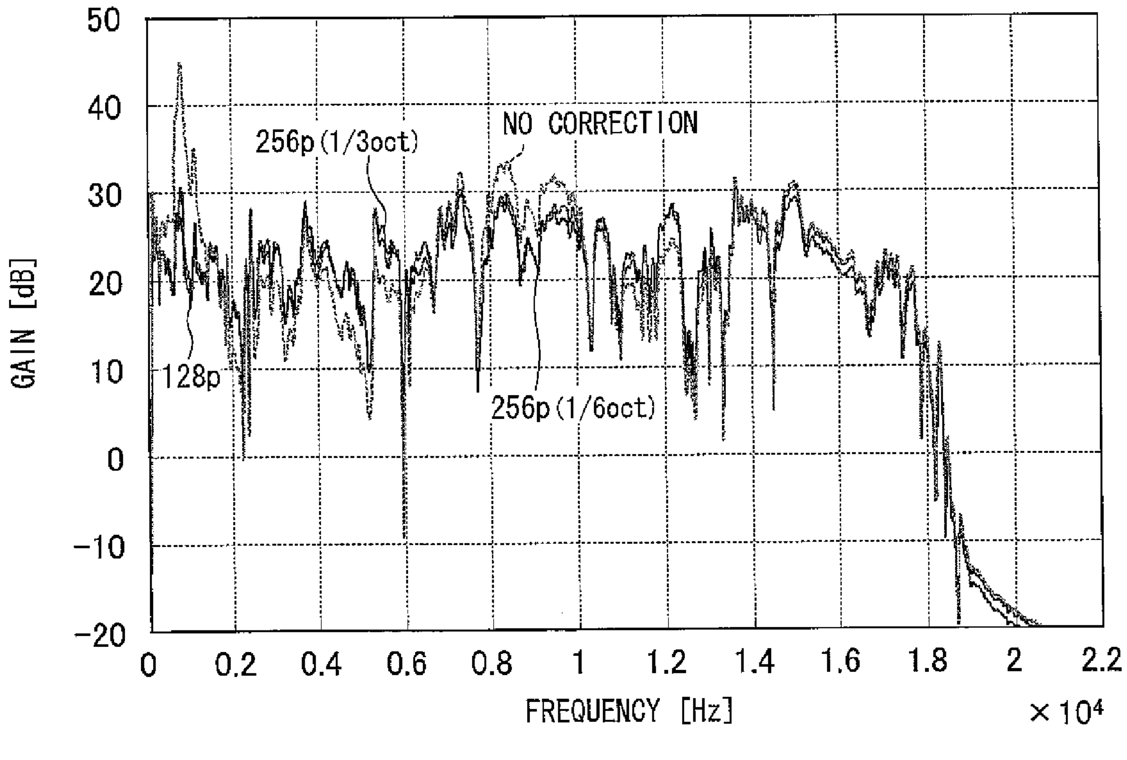

FIGS. 9(*a*) and 9(*b*) show gain-frequency characteristics of the reproduction system 17 in cases where corrections are made by the synthetic inverted filter. FIG. 9(*a*) shows a gain-frequency characteristic within a full range of frequencies, and FIG. 8(*b*) is a gain-frequency characteristic within a range of high frequencies. Each of FIGS. 9(*a*) and 9(*b*) shows examples of cases where the number of taps of the synthetic inverted filter is set to 128 and 256. Further, each of FIGS. 9(*a*) and 9(*b*) shows a gain-frequency characteristic obtained in cases where a correction is made by a synthetic inverted filter that calculates a ⅓ octave average of the gain frequency characteristic |Hsp| and a gain-frequency characteristic obtained in cases where a correction is made by a synthetic inverted filter that calculates a ⅙ octave average of the gain frequency characteristic |Hsp|, in both of which cases the number of taps is 256.

As shown in FIG. 9(*a*), in cases where a correction is made by the synthetic inverted filter, the gain-frequency characteristic is flat over the full range of frequencies. Further, even in cases where the number of taps of the synthetic inverted filter is 128, which is smaller than 256, a corrective effect is obtained which is equal to a corrective effect obtained in cases where the number of taps is 256 (⅓ octave average). Furthermore, as shown in FIG. 9(*b*), in the range of high frequencies, even in cases where the number of taps of the synthetic inverted filter is 128, which is smaller than 256, a corrective effect is obtained which is equal to a corrective effect obtained in cases where the number of taps is 256 (⅙ octave average).

(Effects of Phase Correction and of an Exponential Attenuation Window)

The following fully describes an effect of phase correction and an effect of use of an exponential attenuation window.

Figure 10:
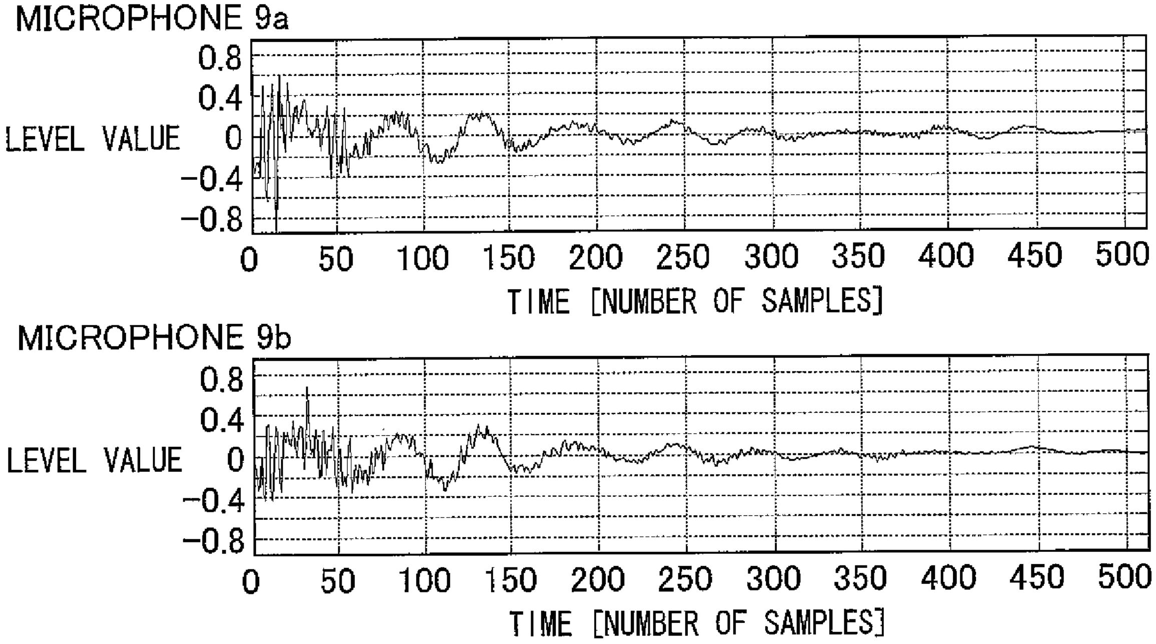
FIG. 10 shows results obtained by measuring impulse responses with use of two microphones installed in a listening room that constitutes the reproduction system, the results being obtained in cases where no correction is made by a FIR filter.

FIG. 10 shows results obtained by measuring impulse responses with use of the microphones 9*a* and 9*b* installed in the listening room 16 that constitutes the reproduction system 17, i.e., results obtained by measuring impulse responses in cases where no corrections are made by the FIR filter. As shown in FIG. 10, in cases where no corrections are made by the FIR filter, the impulse responses do not form a unit impulse and form a periodic waveform regardless of whether the impulse responses are measured by the microphone 9*a* or the microphone 9*b*.

Figure 11:
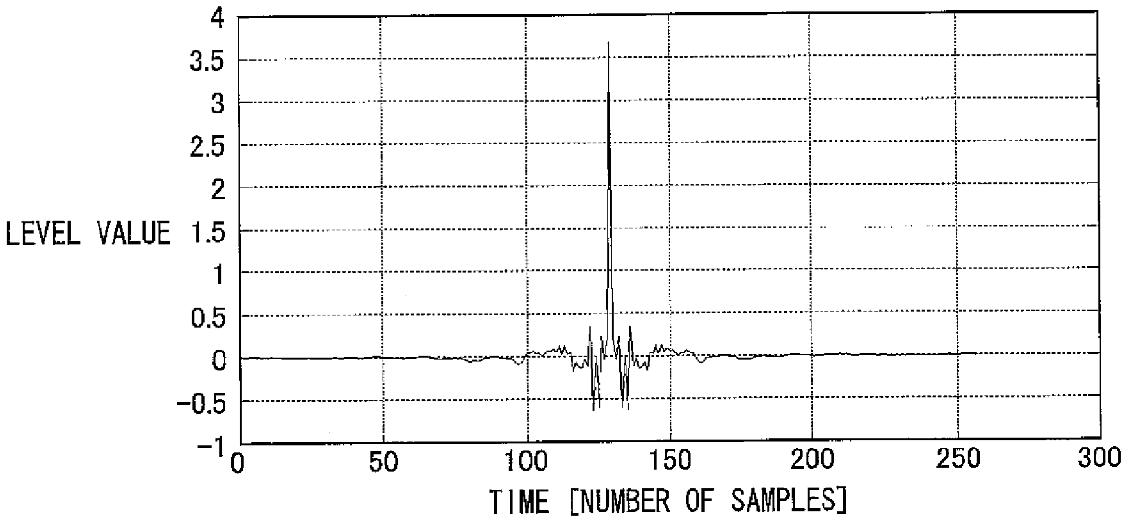
FIGS. 11(*a*) and 11(*b*) each show an effect of correcting acoustic characteristics in the reproduction system by a FIR filter calculated solely in accordance with a gain correction characteristic without combining a phase correction characteristic therewith.
Figure 11:
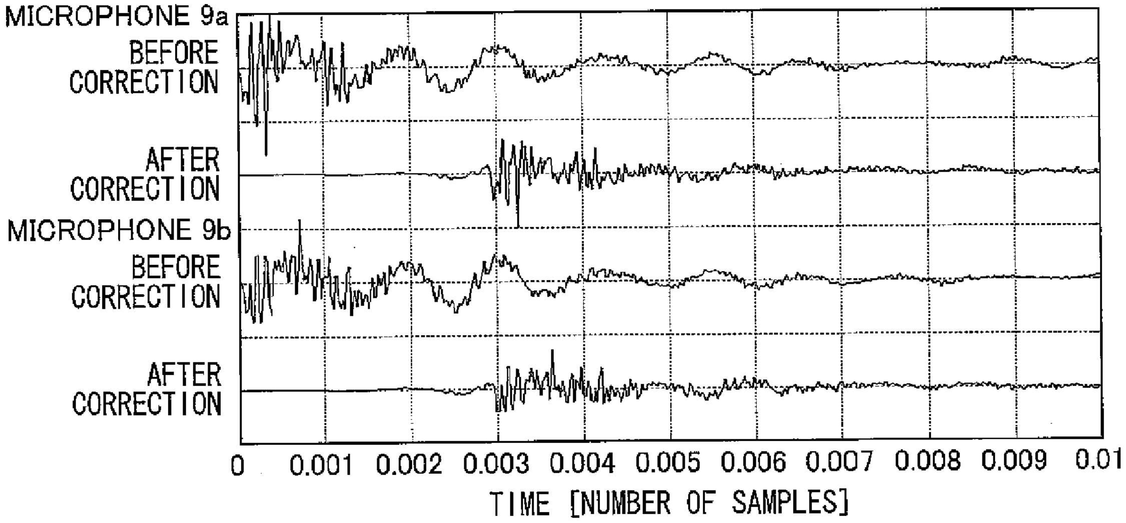

FIGS. 11(*a*) and 11(*b*) show effects of correcting the acoustic characteristics of the reproduction system 17 by a FIR filter calculated solely in accordance with the gain correction characteristic without combining the phase correction characteristic therewith. FIG. 11(*a*) shows impulse responses of the FIR filter calculated solely in accordance with the gain correction characteristic without combining the phase correction characteristic therewith, and FIG. 11(*b*) shows uncorrected and corrected impulse responses produced as a result of measuring impulse responses with use of the microphones 9*a* and 9*b*. As shown in FIG. 11(*a*), the impulse responses of the filter as obtained by performing inverse Fourier transform of the gain correction characteristic alone form a waveform that is centrally concentrated and that is attenuated symmetrically to be centered around the median level value as the peak. In this case, even when clipping is performed in accordance with the limitation of the number of taps of the FIR filter, the amplitude of impulse responses that are discarded (i.e., the number of coefficients of the FIR filter) is small, so that the number of correction errors attributed to the clipping is small. However, as shown in FIG. 11(*b*), the impulse responses of the FIR filter as calculated solely in accordance with the gain correction characteristic, i.e., of the FIR filter calculated without combining the phase correction characteristic therewith do not form a unit impulse having a sharp rising edge.

Figure 12:
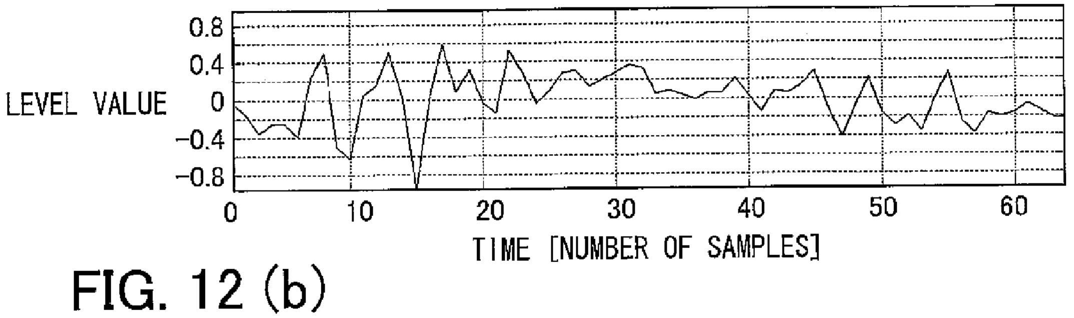
FIGS. 12(*a*) through 12(*d*) each show an effect of correcting acoustic characteristics in the reproduction system by a FIR filter calculated in accordance with a synthetic correction characteristic obtained by combining the gain correction characteristic with a phase correction characteristic calculated without making any adjustment by an exponential attenuation window.
Figure 12:
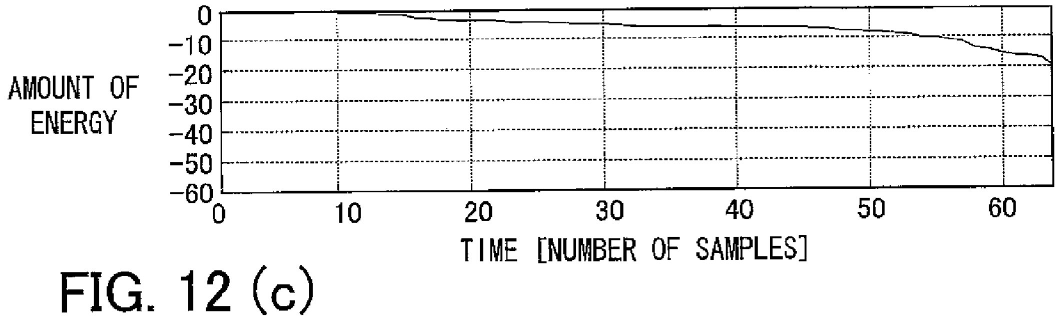
Figure 12:
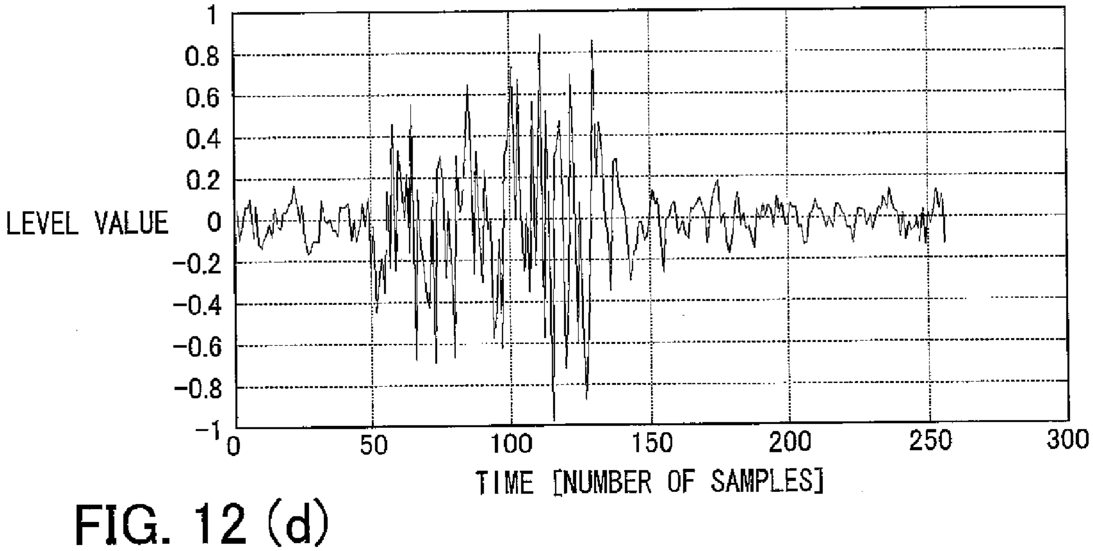
Figure 12:
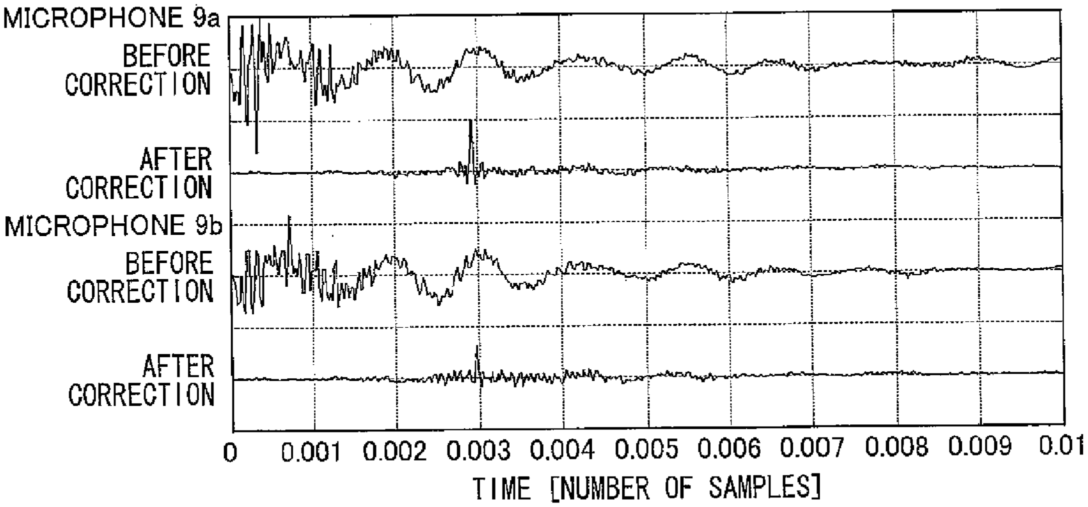

FIGS. 12(*a*) through 12(*d*) each show an effect of correcting the acoustic characteristics of the reproduction system 17 by a FIR filter calculated in accordance with a synthetic correction characteristic obtained by combining the gain correction characteristic with a phase correction characteristic calculated without making any adjustment by an exponential attenuation window. FIG. 12(*a*) shows measured impulse responses for use in combining the phase correction characteristic. FIG. 12(*b*) shows attenuation of reverberant energy at each sampling point with respect to the measured impulse responses of FIG. 12(*a*). FIG. 12(*c*) shows impulse responses of the FIR filter calculated in accordance with the synthetic correction characteristic obtained by combining the gain correction characteristic with the phase correction characteristic calculated without making any adjustment by an exponential attenuation window. FIG. 12(*d*) shows results obtained by measuring uncorrected and corrected impulse responses with use of the microphones 9*a* and 9*b*.

Although the number of sampled impulse responses of FIG. 12(*a*) is 64, the impulse responses do not converge at the 64th sampling point. Further, in the example shown in FIGS. 12(*a*) through (*d*), no exponential attenuation window is applied to the measured impulse responses. Therefore, as shown in FIG. 12(*b*), the reverberant energy is only attenuated up to −20 db at the 64th sampling point. As a result, as shown in FIG. 12(*c*), the impulse responses of the FIR filter calculated in accordance with the synthetic correction characteristic obtained by combining the gain correction characteristic with the phase correction characteristic calculated without making any adjustment by an exponential attenuation window forms a waveform that is entirely broadened due to the influence of circular convolution and that does not converge at either end. As shown in FIG. 12(*d*), in cases where a correction is made by using the FIR filter thus calculated, a waveform similar to a unit impulse having a sharp rising edge is exhibited as compared with the impulse responses, shown in FIG. 11(*b*), which are produced by a FIR filter that does not contain any phase correction. However, there occur preechoes in front of the rising waveform.

Figure 13:
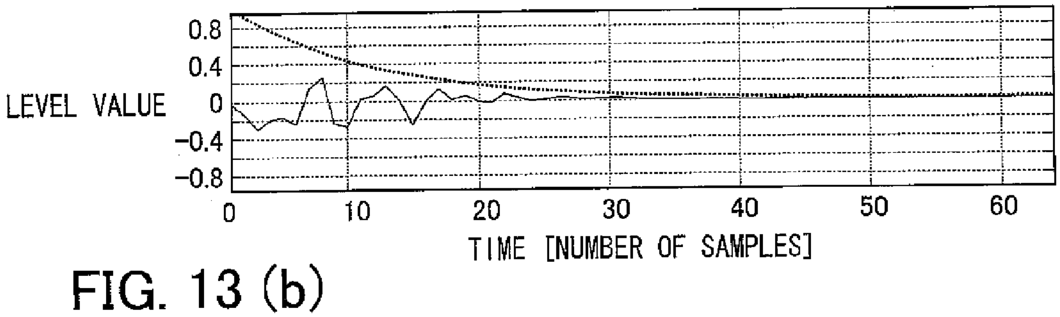
FIGS. 13(*a*) through 13(*d*) each show an effect of correcting acoustic characteristics in the reproduction system by a FIR filter calculated in accordance with a synthetic correction characteristic obtained by combining the gain correction characteristic with a phase correction characteristic calculated by making an adjustment by an exponential attenuation window.
Figure 13:
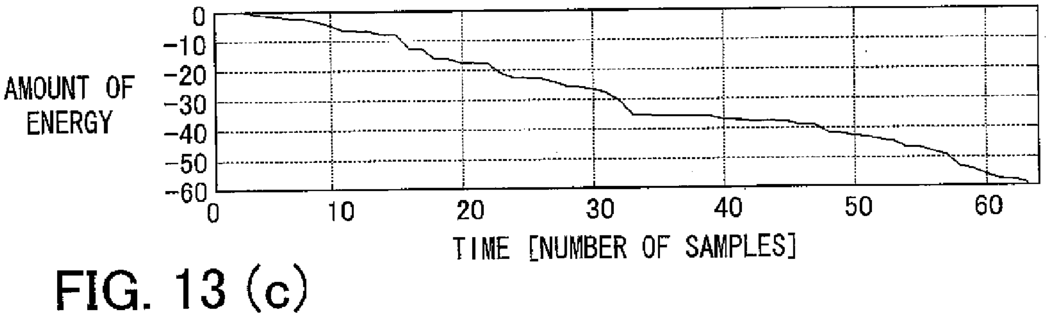
Figure 13:
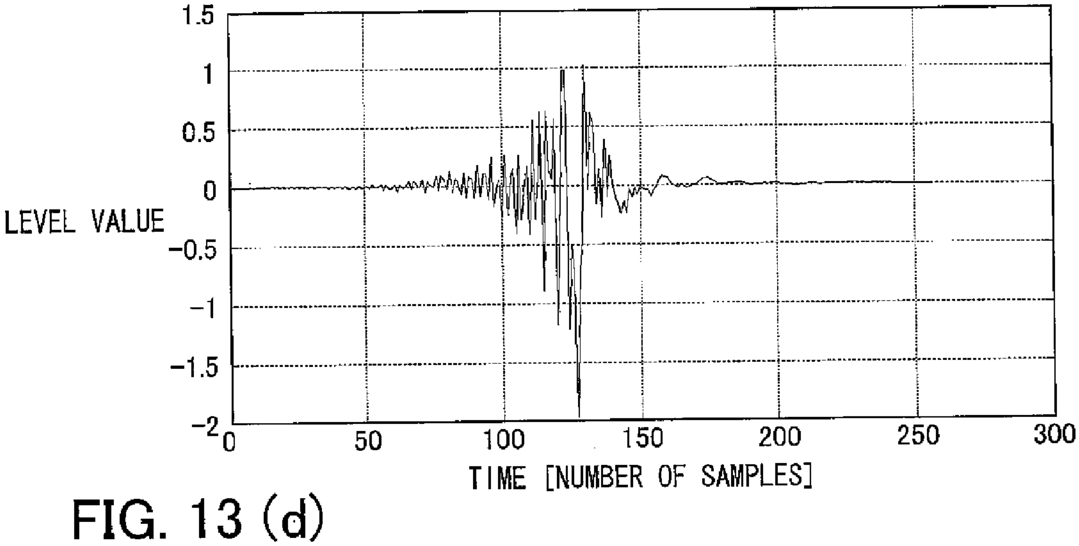
Figure 13:
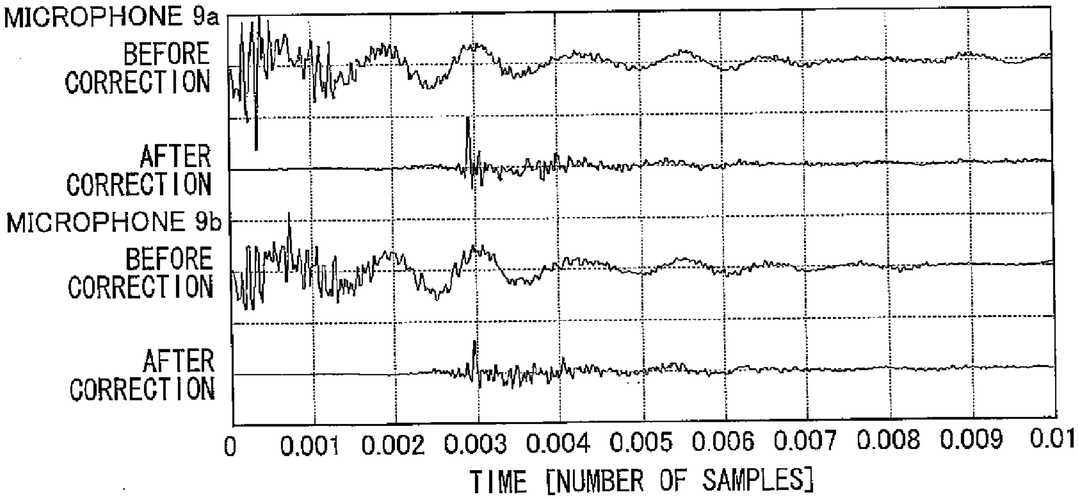
Figure 14:
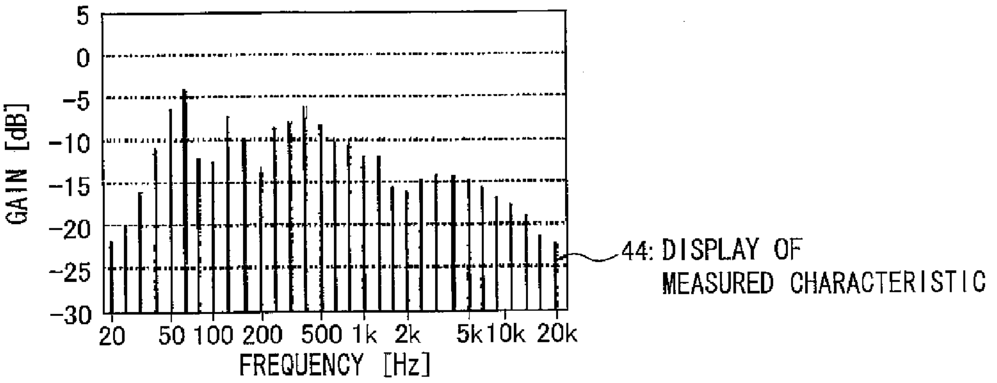
FIGS. 14(*a*) through 14(*e*) show various types of characteristics obtained in steps taken by an acoustic characteristic correction apparatus of Patent Document 1 in correcting acoustic characteristics.
Figure 14:
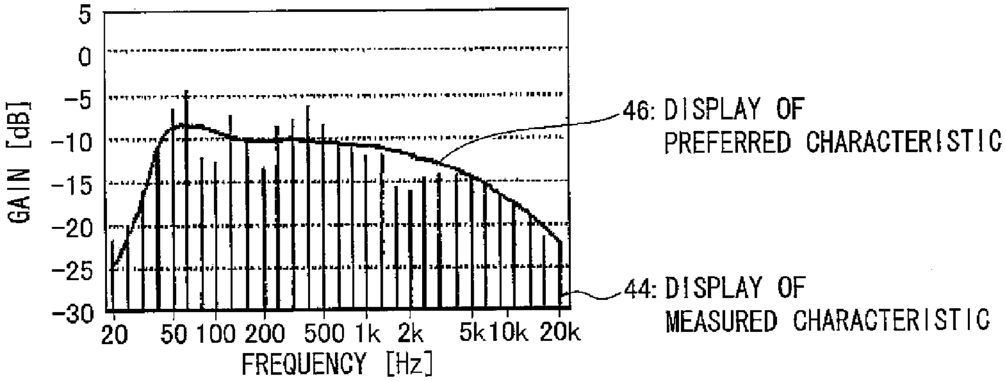
Figure 14:
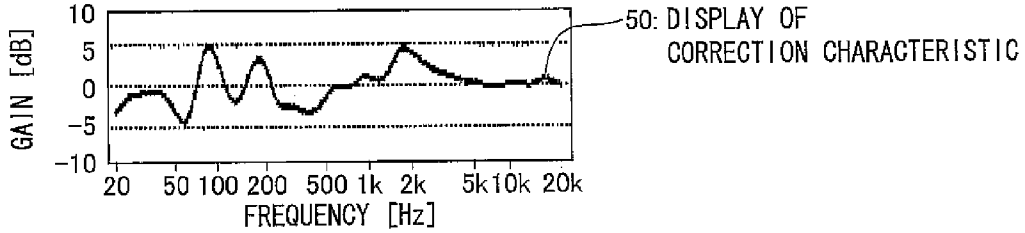
Figure 14:
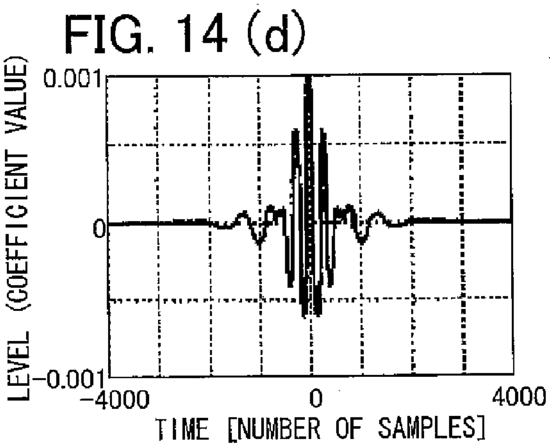
Figure 14:
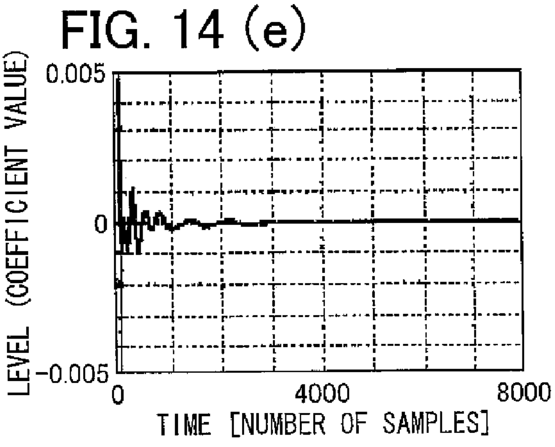
Figure 15:
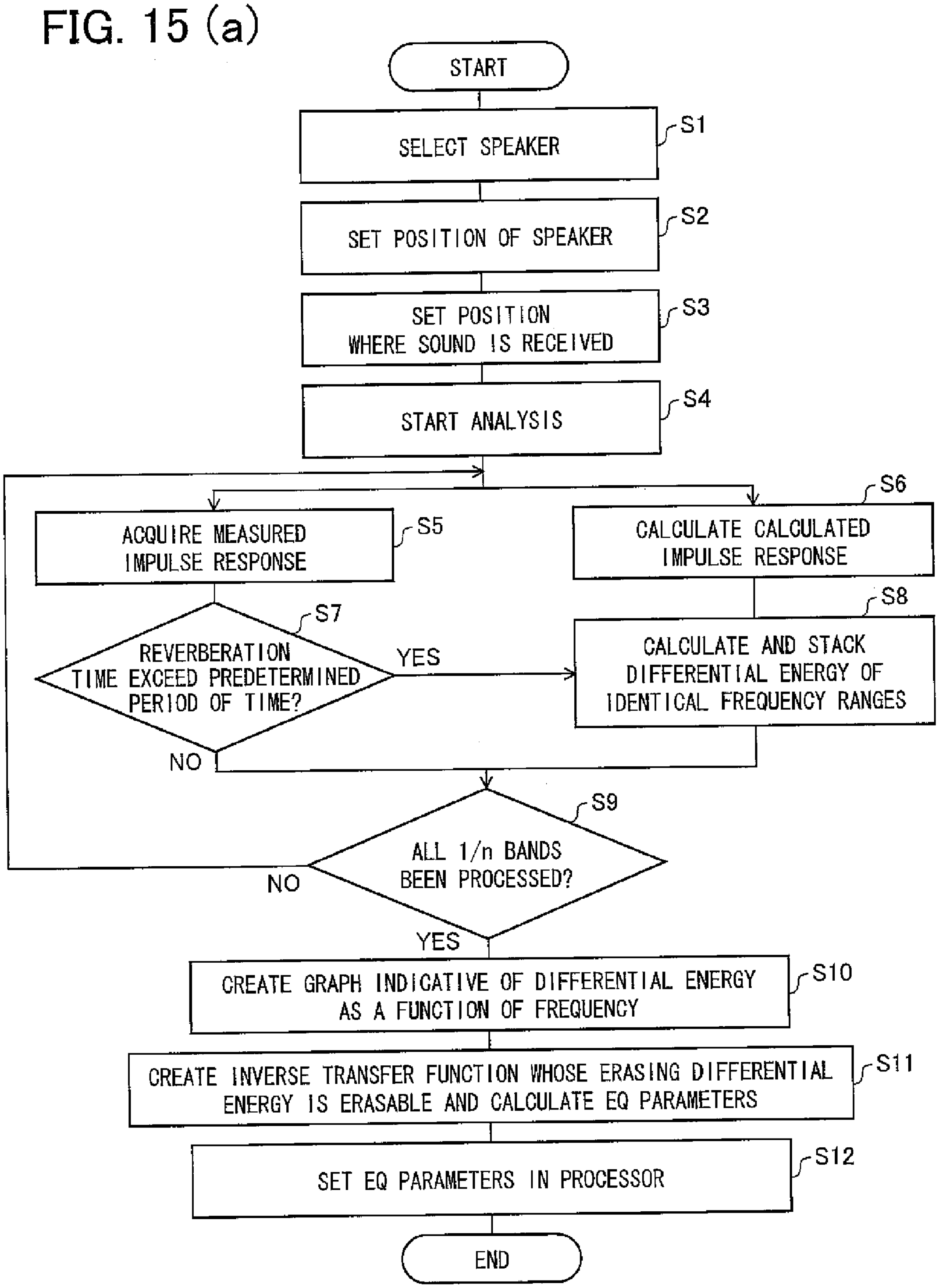
FIGS. 15(*a*) and 15(*b*) each illustrate an amplification articulation improving device of Patent Document 2.
Figure 15:
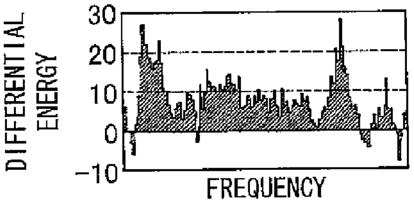

FIGS. 13(*a*) through 13(*d*) each show an effect of correcting the acoustic characteristics of the reproduction system by a FIR filter calculated in accordance with a synthetic correction characteristic obtained by combining the gain correction characteristic with a phase correction characteristic calculated by making an adjustment by an exponential attenuation window. FIG. 13(*a*) shows measured impulse responses for use in combining the phase correction characteristic. FIG. 13(*b*) shows attenuation of reverberant energy at each sampling point with respect to the measured impulse responses of FIG. 13(*a*). FIG. 13(*c*) shows impulse responses of a FIR filter calculated in accordance with the synthetic correction characteristic obtained by combining the gain correction characteristic with the phase correction characteristic calculated by making an adjustment by an index attenuation window. FIG. 13(*d*) shows results obtained by measuring uncorrected and corrected impulse responses with use of the microphones 9*a* and 9*b*.

The number of sampled impulse responses of FIG. 13(*a*) is 64, and the exponential attenuation window is applied so that the impulse responses converge at the 64th sampling point. Therefore, as shown in FIG. 13(*b*), the energy is attenuated down to −60 db at the 64th sampling point. As a result, as shown in FIG. 13(*c*), the impulse responses of the FIR filter calculated in accordance with the synthetic correction characteristic obtained by combining the gain correction characteristic with the phase correction characteristic calculated by making an adjustment by an exponential attenuation window form a waveform that converges at both ends due to a reduction in the influence of circular convolution. As shown in FIG. 13(*d*), in cases where a correction is made by using the FIR filter thus calculated, a unit impulse waveform is formed so as to have a sharper rising edge as compared with the impulse response waveform of FIG. 12(*d*). This prevents preechoes from occurring in front of the rising waveform.

It should be noted that it is not necessary for the phase correction characteristic calculation section 4 to apply an exponential attenuation window to the 64 measured impulse responses sampled. For example, in cases where the impulse responses forms a waveform that converges sufficiently at the 64th sampling point and the reverberant energy is attenuated down to −60 db, the phase correction characteristic calculation section 4 may be arranged, but is not particularly limited, not to apply an exponential attenuation window.

Further, the phase correction characteristic calculation section 4 may be arranged, but is not particularly limited, to determine, in accordance with the measured impulse response data, whether or not the reverberant energy has been attenuated down to −60 dB at the 64th sampling point, and to apply an exponential attenuation window only in cases where the reverberant energy has not been attenuated down to attenuated −60 dB.

It should be noted that the present invention can be expressed in the following manners.

(First Arrangement)

A first arrangement of an audio quality adjusting apparatus including a speaker and a microphone is such that the apparatus includes means for acquiring a gain characteristic and a phase characteristic, means for combining the gain characteristic with the phase characteristic within a frequency domain, and means for making a correction by using the gain characteristic and the phase characteristic thus combined with each other.

(Second Arrangement)

A second arrangement is such that the apparatus includes means for acquiring impulse responses.

(Third Arrangement)

A third arrangement is such that the correcting means is a FIR filter whose number of taps is shorter than a period of time during which the impulse responses continue.

(Fourth Arrangement)

A fourth arrangement is characterized by means for causing the FIR filter to have a variable tap length.

The present invention is not limited to the description of the embodiments above, but may be altered by a skilled person within the scope of the claims. An embodiment based on a proper combination of technical means disclosed in different embodiments is encompassed in the technical scope of the present invention.

Finally, each block of the acoustic characteristic correction apparatus 1 may be constituted by hardware logic, or may be realized by software by using a CPU in the following manner.

That is, the acoustic characteristic correction apparatus 1 includes: (i) a CPU (central processing unit) for executing an instruction of control program realizing various functions; (ii) a ROM (read-only memory) storing the program; (iii) a RAM (random-access memory) for expanding the program; (iv) a storage device (storage medium) such as a memory storing the program and various data; and (v) the like. The object of the present invention also can be achieved by (i) providing, for the acoustic characteristic correction apparatus 1, a storage medium storing, in a computer readable manner, a program code (executable program; intermediate code; source program) of the control program for the present system, and (ii) causing a computer (CPU or MPU) to read and execute the program code stored in the storage medium, the program code being the software realizing the aforementioned functions.

Examples of the storage medium are: (i) tapes such as a magnetic tape and a cassette tape; (ii) magnetic disks such as a floppy® disk and a hard disk; (iii) optical disks such as a compact disk read only memory (CD-ROM), a magnetic optical disk (MO), a mini disk (MD), a digital video disk (DVD), and a CD-Rewritable (CD-R); (iv) cards such as an IC card (inclusive of a memory card) and an optical card; and (v) semiconductor memories such as a mask ROM, an EPROM (electrically programmable read only memory), an EEPROM (electrically erasable programmable read only memory), and a flash ROM.

Further, the acoustic characteristic correction apparatus 1 may be connectable to a communication network, and the program code may be supplied via the communication network. The communication network is not particularly limited. Specific examples thereof are: the Internet, Intranet, Extranet, LAN (local area network), ISDN (integrated services digital network), VAN (value added network), CATV (cable TV) communication network, virtual private network, telephone network, mobile communication network, satellite communication network, and the like. Further, the transmission medium constituting the communication network is not particularly limited. Specific examples thereof are: (i) a wired channel using an IEEE 1394, a USB (universal serial bus), a power-line communication, a cable TV line, a telephone line, an ADSL line, or the like; or (ii) a wireless communication using IrDA, infrared rays used for a remote controller, Bluetooth®, IEEE 802.11, HDR (High Data Rate), a mobile phone network, a satellite connection, a terrestrial digital network, or the like. Note that, the present invention can be realized by (i) a carrier wave realized by electronic transmission of the program code, or (ii) a form of a series of data signals.

A filter coefficient calculation device according to the present invention is a filter coefficient calculation device for calculating filter coefficients of a reproduction characteristic correction filter that corrects acoustic characteristics of a reproduction system configured to include an acoustic field, including: linear-phase impulse response calculating means for calculating impulse responses corresponding to a linear-phase filter having an inverse characteristic of a gain characteristic of the reproduction system; gain correction characteristic calculating means for calculating, as a gain correction characteristic, a frequency characteristic of continuous-time impulse responses that include a peak value, the continuous-time impulse responses being impulse responses, clipped from the impulse responses calculated by the linear-phase impulse response calculating means, whose number is identical to a preset number of filter taps; phase correction characteristic calculating means for calculating a phase correction characteristic by normalizing, from an inverse characteristic of a frequency characteristic of the reproduction system, a gain characteristic of the inverse characteristic; and filter coefficient calculating means for calculating, as filter coefficients of the reproduction characteristic correction filter, filter coefficients of a filter having a synthetic correction characteristic obtained by combining the gain correction characteristic with the phase correction characteristic.

Further, a filter coefficient calculating method according to the present invention is a filter coefficient calculation method for calculating filter coefficients of a reproduction characteristic correction filter that corrects acoustic characteristics of a reproduction system configured to include an acoustic field, including: linear-phase impulse response calculating step of calculating impulse responses corresponding to a linear-phase filter having an inverse characteristic of a gain characteristic of the reproduction system; gain correction characteristic calculating step of calculating, as a gain correction characteristic, a frequency characteristic of continuous-time impulse responses that include a peak value, the continuous-time impulse responses being impulse responses, clipped from the impulse responses calculated by the linear-phase impulse response calculating means, whose number is identical to a preset number of filter taps; phase correction characteristic calculating step of calculating a phase correction characteristic by normalizing, from an inverse characteristic of a frequency characteristic of the reproduction system, a gain characteristic of the inverse characteristic; and filter coefficient calculating step of calculating, as filter coefficients of the reproduction characteristic correction filter, filter coefficients of a filter having a synthetic correction characteristic obtained by combining the gain correction characteristic with the phase correction characteristic.

This makes it possible to reduce the amplitude (FIR filter coefficients) of impulse responses that are discarded in cases where a gain correction characteristic for correcting a gain characteristic is calculated. Further, the gain correction characteristic is combined with a phase correction characteristic for correcting a phase characteristic. Therefore, even in cases where the number of filter taps is limited, a filter capable of precisely correcting acoustic characteristics can be realized.

The filter coefficient calculation device according to the present invention is preferably arranged so as to further include measured impulse response calculating means for calculating a measured impulse response from audio data obtained by collecting sound reproduced in accordance with a measuring signal in the reproduction system.

According to the foregoing arrangement, the measured impulse response calculating means calculates a measured impulse response from audio data obtained by collecting sound reproduced in accordance with a measuring signal in the reproduction system. This makes it possible to calculate filter coefficients of a reproduction characteristic correction filter in accordance with impulse responses actually measured in the reproduction system.

The filter coefficient calculation device according to the present invention is preferably arranged so as to further include attenuating means for calculating an exponential attenuation impulse response by applying such an exponential attenuation window to the measured impulse response as to cause reverberant energy of the measured impulse response to be smaller than a preset threshold value during a preset measuring time, wherein the phase correction characteristic calculating means calculates the inverse characteristic of the frequency characteristic of the reproduction system.

According to the foregoing arrangement, the attenuating means calculates an exponential attenuation impulse response by applying such an exponential attenuation window as to cause the reverberant energy of the measured impulse response to be smaller than the preset threshold value during the preset measuring time. Moreover, the phase correction characteristic calculating means calculates the inverse characteristic of the frequency characteristic of the reproduction system.

This makes it possible to calculate a phase correction characteristic in accordance with impulse responses of a sufficiently converged waveform. This makes it possible to, when the reproduction characteristic correction filter is calculated from the synthetic correction characteristic, reduce alias phenomena caused by the influence of circular convolution. This makes it possible to improve the precision of correction of acoustic characteristics by the reproduction characteristic correction filter.

The filter coefficient calculation device according to the present invention is preferably arranged so as to further include attenuation determining means for determining whether or not the reverberant energy of the measured impulse response is smaller than the threshold value during the measuring time, wherein the attenuating means applies the exponential attenuation window to the measured impulse response when the attenuation determining means determines that the reverberant energy of the measured impulse response is not smaller than the threshold value during the measuring time.

According to the foregoing arrangement, the attenuation determining means determines whether or not the reverberant energy of the measured impulse response is smaller than the threshold value during the measuring time. Moreover, the attenuating means applies the exponential attenuation window to the measured impulse response when the attenuation determining means determines that the reverberant energy of the measured impulse response is not smaller than the threshold value during the measuring time. This makes it possible to perform a process of applying the exponential attenuation window as needed.

The filter coefficient calculation device according to the present invention is preferably arranged so as to further include filter tap number changing means for changing the preset number of filter taps.

According to the foregoing arrangement, the filter tap number changing means can change the set number of filter taps in accordance with a user's instruction. Further, in cases where it is possible to acquire information indicative of the number of applicable filter taps from a DSP, the setting can be changed in accordance with the acquired information on the number of taps.

A filter coefficient calculation device according to the present invention includes: a filter coefficient calculation device as set forth in any of claims 1 to 5; and a convolution computation device for performing, with respect to an audio signal inputted from an audio signal input device, a computation of convolution of filter coefficients of a reproduction characteristic correction filter as calculated by the filter coefficient calculation device, and for supplying, to an audio output device, the audio signal thus subjected to the computation of convolution of filter coefficients.

According to the foregoing arrangement, in the audio signal processing apparatus according to the present invention, the filter coefficient calculating means of the filter coefficient calculation device calculates filter coefficients of a reproduction characteristic correction filter. Moreover, the convolution computation device performs, with respect to an audio signal inputted from an audio signal input device, a computation of convolution of the filter coefficients of the reproduction characteristic correction filter as calculated by the filter coefficient calculation device, and for supplying, to an audio output device, the audio signal to which a synthetic correction characteristic has been imparted.

This enables the audio signal processing apparatus according to the present invention to impart a synthetic correction characteristic to the audio signal by using the reproduction characteristic correction filter generated by the filter coefficient calculation device. Therefore, the audio signal processing apparatus according to the present invention makes it possible to correct the acoustic characteristics of a reproduction system with high precision even in cases where the number of filter taps is limited.

It should be noted that the filter coefficient calculation device may be realized by a computer. In this case, a control program for realizing the filter coefficient calculation device in a computer by operating the computer as each of the means and a computer-readable storage medium in which the control program is stored are also encompassed in the scope of the present invention.

A filter coefficient calculation device according to the present invention can be mounted in an apparatus for correcting the response characteristics of a listening room or the like with respect to sound outputted from an audio output device, and can be suitably used for constituting a room equalizer or the like.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A filter coefficient calculation device for calculating filter coefficients of a reproduction characteristic correction filter that corrects acoustic characteristics of a reproduction system configured to include an acoustic field, comprising:

linear-phase impulse response calculating means for calculating impulse responses corresponding to a linear-phase filter having an inverse characteristic of a gain characteristic of the reproduction system;

gain correction characteristic calculating means for calculating, as a gain correction characteristic, a frequency characteristic of continuous-time impulse responses that include a peak value, the continuous-time impulse responses being impulse responses, clipped from the impulse responses calculated by the linear-phase impulse response calculating means, whose number is identical to a preset number of filter taps;

phase correction characteristic calculating means for calculating a phase correction characteristic by normalizing, from an inverse characteristic of a frequency characteristic of the reproduction system, a gain characteristic of the inverse characteristic; and filter coefficient calculating means for calculating, as filter coefficients of the reproduction characteristic correction filter, filter coefficients of a filter having a synthetic correction characteristic obtained by combining the gain correction characteristic with the phase correction characteristic.

2. The filter coefficient calculation device as set forth in claim 1, further comprising measured impulse response calculating means for calculating a measured impulse response from audio data obtained by collecting sound reproduced in accordance with a measuring signal in the reproduction system.

3. The filter coefficient calculation device as set forth in claim 2, further comprising attenuating means for calculating an exponential attenuation impulse response by applying such an exponential attenuation window to the measured impulse response as to cause reverberant energy of the measured impulse response to be smaller than a preset threshold value during a preset measuring time, wherein the phase correction characteristic calculating means calculates the inverse characteristic of the frequency characteristic of the reproduction system from the exponential attenuation impulse response.

4. The filter coefficient calculation device as set forth in claim 3, further comprising attenuation determining means for determining whether or not the reverberant energy of the measured impulse response is smaller than the threshold value during the measuring time, wherein the attenuating means applies the exponential attenuation window to the measured impulse response when the attenuation determining means determines that the reverberant energy of the measured impulse response is not smaller than the threshold value during the measuring time.

5. The filter coefficient calculation device as set forth in claim 1, further comprising filter tap number changing means for changing the preset number of filter taps.

6. An audio signal processing apparatus comprising:

a filter coefficient calculation device as set forth in claim 1; and a convolution computation device for performing, with respect to an audio signal inputted from an audio signal input device, a computation of convolution of filter coefficients of a reproduction characteristic correction filter as calculated by the filter coefficient calculation device, and for supplying, to an audio output device, the audio signal thus subjected to the computation of convolution of filter coefficients.

7. A control program for operating a filter coefficient calculation device as set forth in claim 1, the control program causing a computer to function as each means of the filter coefficient calculation device.

8. A non-transitory computer-readable storage medium in which the control program as set forth in claim 7 is stored.

9. A filter coefficient calculation method for calculating filter coefficients of a reproduction characteristic correction filter that corrects acoustic characteristics of a reproduction system configured to include an acoustic field, comprising:

linear-phase impulse response calculating step of calculating impulse responses corresponding to a linear-phase filter having an inverse characteristic of a gain characteristic of the reproduction system;

gain correction characteristic calculating step of calculating, as a gain correction characteristic, a frequency characteristic of continuous-time impulse responses that include a peak value, the continuous-time impulse responses being impulse responses, clipped from the impulse responses calculated by the linear-phase impulse response calculating step, whose number is identical to a preset number of filter taps;

phase correction characteristic calculating step of calculating a phase correction characteristic by normalizing, from an inverse characteristic of a frequency characteristic of the reproduction system, a gain characteristic of the inverse characteristic; and filter coefficient calculating step of calculating, as filter coefficients of the reproduction characteristic correction filter, filter coefficients of a filter having a synthetic correction characteristic obtained by combining the gain correction characteristic with the phase correction characteristic.

* * * * *